(12) United States Patent
Kang et al.

(10) Patent No.: US 12,418,823 B2
(45) Date of Patent: Sep. 16, 2025

(54) DEVICE AND METHOD FOR ALLOCATING RESOURCE IN WIRELESS COMMUNICATION SYSTEM

(71) Applicant: Samsung Electronics Co., Ltd., Gyeonggi-do (KR)

(72) Inventors: Hyunjeong Kang, Gyeonggi-do (KR); Sunghoon Kim, Gyeonggi-do (KR); Hoyeon Lee, Gyeonggi-do (KR); Sangkyu Baek, Gyeonggi-do (KR)

(73) Assignee: Samsung Electronics Co., Ltd., Seoul (KR)

(*) Notice: Subject to any disclaimer, the term of this patent is extended or adjusted under 35 U.S.C. 154(b) by 597 days.

(21) Appl. No.: 17/635,250

(22) PCT Filed: Aug. 13, 2020

(86) PCT No.: PCT/KR2020/010804
§ 371 (c)(1),
(2) Date: Jun. 6, 2022

(87) PCT Pub. No.: WO2021/029717
PCT Pub. Date: Feb. 18, 2021

(65) Prior Publication Data
US 2022/0303821 A1   Sep. 22, 2022

(30) Foreign Application Priority Data

Aug. 13, 2019  (KR) .................. 10-2019-0099130
Mar. 20, 2020  (KR) .................. 10-2020-0034640

(51) Int. Cl.
*H04W 28/02*   (2009.01)
*H04W 72/23*   (2023.01)
(Continued)

(52) U.S. Cl.
CPC ... *H04W 28/0263* (2013.01); *H04W 28/0268* (2013.01); *H04W 28/0278* (2013.01);
(Continued)

(58) Field of Classification Search
CPC . H04W 28/0263; H04W 76/14; H04W 72/23; H04W 28/0268; H04W 28/0278; H04W 80/02; H04W 92/18
See application file for complete search history.

(56) References Cited

U.S. PATENT DOCUMENTS 11,838,936 B2 * 12/2023 Kung .................... H04W 72/54
2017/0353819 A1 * 12/2017 Yin ......................... H04W 4/70
(Continued)

FOREIGN PATENT DOCUMENTS

WO    WO 2019061180       4/2019

OTHER PUBLICATIONS

European Search Report dated Oct. 28, 2022 issued in counterpart application No. 20853432.1-1215, 13 pages.
(Continued)

*Primary Examiner* — Michael J Moore, Jr.
(74) *Attorney, Agent, or Firm* — The Farrell Law Firm, P.C.

(57) ABSTRACT

The disclosure relates to a 5G or a 4G communication system for supporting a higher data transmission rate. The present disclosure relates to a method and a device for processing sidelink resource allocation in a V2X system. According to various embodiments of the present disclosure, in a wireless communication system, a terminal may include at least one transceiver and at least one processor coupled to the at least one transceiver. The at least one processor may be configured to: acquire aggregate maximum bit rate (AMBR) information regarding a PC5 unicast link for sidelink communication of the terminal; provide the AMBR
(Continued)

information to a base station; receive information regarding a resource for the sidelink communication, which has been allocated on the basis of the AMBR information, from the base station; and transmit data following the sidelink communication to another terminal on the basis of the resource.

16 Claims, 27 Drawing Sheets

(51) Int. Cl.
*H04W 76/14* (2018.01)
*H04W 80/02* (2009.01)
*H04W 92/18* (2009.01)

(52) U.S. Cl.
CPC ........... *H04W 72/23* (2023.01); *H04W 76/14* (2018.02); *H04W 80/02* (2013.01); *H04W 92/18* (2013.01)

(56) References Cited

U.S. PATENT DOCUMENTS

| | | | |
|---|---|---|---|
| 2018/0132208 A1 | 5/2018 | Pan et al. | |
| 2019/0037448 A1 | 1/2019 | Shan et al. | |
| 2019/0124015 A1 | 4/2019 | Loehr et al. | |
| 2019/0239112 A1* | 8/2019 | Rao | H04L 1/08 |
| 2020/0163005 A1* | 5/2020 | Rao | H04W 4/44 |
| 2020/0305174 A1* | 9/2020 | Ganesan | H04W 72/12 |
| 2020/0314953 A1* | 10/2020 | Lin | H04W 72/56 |
| 2021/0045178 A1* | 2/2021 | Kung | H04W 76/18 |
| 2021/0243837 A1* | 8/2021 | Jung | H04W 56/001 |
| 2021/0307106 A1* | 9/2021 | Zhao | H04W 76/27 |
| 2022/0132603 A1* | 4/2022 | Adjakple | H04W 76/14 |
| 2022/0166556 A1* | 5/2022 | Lee | H04W 4/40 |
| 2022/0247539 A1* | 8/2022 | Luo | H04L 1/1854 |
| 2022/0303821 A1* | 9/2022 | Kang | H04W 28/0278 |
| 2022/0369158 A1* | 11/2022 | Zhao | H04W 76/30 |

OTHER PUBLICATIONS

Chinese Office Action dated May 31, 2024 issued in counterpart application No. 202080071643.9, 21 pages.
Ericsson, "On Layer 1 IDs", R1-1907152, 3GPP TSG-RAN WG1 Meeting #97, May 13-17, 2019, 5 pages.
European Search Report dated Jul. 25, 2022 issued in counterpart application No. 20853432.1-1215, 15 pages.
PCT/ISA/210 Search Report issued on PCT/KR2020/010804, Nov. 25, 2020, pp. 7.
PCT/ISA/237 Written Opinion issued on PCT/KR2020/010804, Nov. 25, 2020, pp. 12.
Sharp, 3GPP TSG RAN WG1 Meeting #97 R1-1907216, Reno, USA, May 13-17, 2019, "Physical layer structure for NR sidelink", pp. 5.
3GPP TS 23.287 V1.1.0 (Jul. 2019), Technical Specification,3rd Generation Partnership Project; Technical Specification Group Services and System Aspects; Architecture enhancements for 5G System (5GS) to support Vehicle-to-Everything (V2X) services (Release 16), pp. 50.
3GPP Tr 38.885 V16.0.0 (Mar. 2019), Technical Report,3rd Generation Partnership Project; Technical Specification Group Radio Access Network; NR; Study on NR Vehicle-to-Everything (V2X), (Release 16), pp. 122.
Huawei, HiSilicon, 3GPP TSG-RAN WG2 Meeting #106 R2-1907461 Reno, USA, May 13-17, 2019 (Resubmission of R2-1904091), "On reception of MAC PDU in NR SL", pp. 3.
Chinese Office Action dated Nov. 27, 2024 issued in counterpart application No. 202080071643.9, 13 pages.
European Search Report dated Nov. 29, 2024 issued in counterpart application No. 20853432.1-1215, 9 pages.
Korean Office Action dated Dec. 28, 2024 issued in counterpart application No. 10-2020-0034640, 27 pages.
3GPP TS 36.323 V15.4.0, (Jun. 2019), pp. 52.
CN Rejection Decision dated Mar. 1, 2025 issued in counterpart application No. 202080071643.9, 14 pages.

* cited by examiner

DEVICE AND METHOD FOR ALLOCATING RESOURCE IN WIRELESS COMMUNICATION SYSTEM

PRIORITY

This application is a National Phase Entry of International Application No. PCT/KR2020/010804, which was filed on Aug. 13, 2020, and claims priority to Korean Patent Application Nos. 10-2019-0099130 and 10-2020-0034640, filed in the Korean Intellectual Property Office on Aug. 13, 2019 and Mar. 20, 2020, respectively, the entire content of each of which is incorporated herein by reference.

TECHNICAL FIELD

The disclosure relates generally to a wireless communication system and, more particularly, to an apparatus and a method for allocating a resource in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

There has been research regarding communication using vehicles such as between a vehicle and another vehicle, between a vehicle and a terminal, or between a vehicle and a structure (hereinafter, referred to as vehicle-to-everything (V2X)) in a 5G communication system, and it is expected that various services may be provided to users by using V2X.

DISCLOSURE OF INVENTION

Technical Problem

Based on the above description, the disclosure provides an apparatus and a method for processing sidelink transmission resource allocation in a wireless communication system.

In addition, the disclosure provides an apparatus and a method for allocating a resource in view of an aggregated maximum bit rate (AMBR) of a PC5 unicast link.

In addition, the disclosure provides an apparatus and a method for a sidelink bearer (SLRB) configuration with regard to each packet in a wireless communication system.

In addition, the disclosure provides an apparatus and a method for managing a packet type, in order to quickly process a packet in a wireless communication system.

In addition, the disclosure provides an apparatus and a method for allocating a resource in a semi-persistent manner, for aperiodic traffic in a wireless communication system.

According to various embodiments of the disclosure, an operation method of a terminal in a wireless communication system may include determining a "PC5 unicast link aggregated maximum bit rate" (hereinafter, referred to as "PC5-LINK-AMBR") regarding a sidelink, transferring information regarding the PC5-LINK-AMBR to a base station, receiving a sidelink radio resource based on PC5-LINK-AMBR allocated from the base station, and transmitting sidelink data by using the allocated sidelink radio resource.

According to various embodiments of the disclosure, a terminal in a wireless communication system includes a transceiver and at least one processor connected to the transceiver. The at least one processor may determine a PC5-LINK-AMBR regarding a sidelink, transfer information regarding the PC5-LINK-AMBR to a base station, receive a sidelink radio resource based on PC5-LINK-AMBR allocated from the base station, and transmit sidelink data by using the allocated sidelink radio resource.

According to various embodiments of the disclosure, in a wireless communication system, an operation method of a base station may include acquiring aggregated maximum bit rate (AMBR) information regarding a PC5 unicast link for sidelink communication of a terminal, allocating a resource for sidelink communication of the terminal based on the AMBR information, and transmitting information regarding the allocated resource to the terminal.

According to various embodiments of the disclosure, in a wireless communication system, an operation method of a terminal may include acquiring aggregated maximum bit rate (AMBR) information regarding a PC5 unicast link for sidelink communication of the terminal, providing the AMBR information to a base station, receiving, from the base station, information regarding a resource for the sidelink communication, which has been allocated based on the AMBR information, and transmitting data following the sidelink communication to another terminal based on the resource.

According to various embodiments of the disclosure, in a wireless communication system, an operation method of abase station may include receiving a signal for requesting sidelink radio bearer (SLRB) configuration from a terminal, acquiring packet type information regarding a sidelink flow of the terminal from the signal, generating SLRB configuration information regarding a packet type of the sidelink flow based on the packet type information, and transmitting the SLRB configuration information to the terminal, wherein the packet type is at least one of an IP packet, a non-IP packet, PC5-S signaling, and PC5-radio resource control (RRC) signaling.

According to various embodiments of the disclosure, in a wireless communication system, an operation method of a terminal may include generating a sidelink flow for sidelink communication of the terminal, determining a packet type of the sidelink flow, and identifying sidelink radio bearer (SLRB) configuration corresponding to the packet type, wherein the identifying of the SLRB configuration includes receiving information regarding SLRB configuration corresponding to the packet type from a base station when the terminal is in radio resource control (RRC) CONNECTED, receiving configuration information including SRLB configuration for each packet and identifying SLRB configuration corresponding to the packet type from the configuration information when the terminal is in RRC INACTIVE or RRC IDLE, and identifying the SLRB configuration corresponding to the packet type from pre-configuration information including the SRLB configuration for each packet when the terminal is located out-of-coverage.

According to various embodiments of the disclosure, in a wireless communication system, an operation method of a first terminal may include generating a sidelink flow for sidelink communication between a first terminal and a second terminal, and transmitting sidelink-related information for indicating a packet type of the sidelink flow to the second terminal, wherein the packet type is identified based on at least one of: an identifier of the sidelink flow of a service data adaptation protocol (SDAP) layer of the first terminal; sidelink radio bearer (SLRB) information mapped to the sidelink flow of the first terminal; or a service data unit (SDU) type of a packet data convergence protocol (PDCP) layer of the first terminal.

According to various embodiments of the disclosure, in a wireless communication system, a base station may include at least one transceiver and at least one processor coupled to the at least one transceiver, wherein the at least one processor is configured to acquire aggregate maximum bit rate (AMBR) information regarding a PC5 unicast link for sidelink communication of the terminal, allocate a resource for sidelink communication of the terminal based on the AMBR information, and transmit information regarding the allocated resource to the terminal.

According to various embodiments of the disclosure, in a wireless communication system, a terminal may include at least one transceiver and at least one processor coupled to the at least one transceiver, wherein the at least one processor is configured to acquire aggregated maximum bit rate (AMBR) information regarding a PC5 unicast link for sidelink communication of the terminal, provide the AMBR information to a base station, receive, from the base station, information regarding a resource for the sidelink communication, which has been allocated based on the AMBR information, and transmit data following the sidelink communication to another terminal based on the resource.

According to various embodiments of the disclosure, a base station may include at least one transceiver, and at least one processor coupled to the at least one transceiver, wherein the at least one processor is configured to receive a signal for requesting sidelink radio bearer (SLRB) configuration from a terminal, acquire packet type information regarding a sidelink flow of the terminal from the signal, generate SLRB configuration information regarding a packet type of the sidelink flow based on the packet type information, and transmit the SLRB configuration information to the terminal, wherein the packet type is at least one of an IP packet, a non-IP packet, PC5-S signaling, and PC5-radio resource control (RRC) signaling.

According to various embodiments of the disclosure, in a wireless communication system, a terminal may include at least one transceiver, and at least one processor coupled to the at least one transceiver, wherein the at least one processor is configured to generate a sidelink flow for sidelink communication of the terminal, determine a packet type of the sidelink flow, and identify sidelink radio bearer (SLRB) configuration corresponding to the packet type, wherein, in order to identify the SLRB configuration, the at least one processor is configured to receive information regarding SLRB configuration corresponding to the packet type from a base station when the terminal is in radio resource control (RRC) CONNECTED, receive configuration information including SRLB configuration for each packet and identify SLRB configuration corresponding to the packet type from the configuration information when the terminal is in RRC INACTIVE or RRC IDLE, and identify the SLRB configuration corresponding to the packet type from pre-configuration information including the SRLB configuration for each packet when the terminal is located out-of-coverage.

According to various embodiments of the disclosure, in a wireless communication system, a first terminal may include at least one transceiver, and at least one processor coupled to the at least one transceiver, wherein the at least one processor is configured to generate a sidelink flow for sidelink communication between a first terminal and a second terminal, and transmit sidelink-related information for indicating a packet type of the sidelink flow to the second terminal, wherein the packet type is identified based on at least one of: an identifier of the sidelink flow of a service data adaptation protocol (SDAP) layer of the first terminal; sidelink radio bearer (SLRB) information mapped to the sidelink flow of the first terminal; or a service data unit (SDU) type of a packet data convergence protocol (PDCP) layer of the first terminal.

According to various embodiments of the disclosure, an operation method for a sidelink, performed by a terminal, in a wireless communication system may include receiving a sidelink signal, obtaining sidelink control information (SCI) of the sidelink signal, and obtaining a medium access control (MAC) packet data unit (PDU) of the side link signal, wherein the SCI includes a cast type indicator, first source identifier information, and first destination identifier information, and the cast type indicator indicates one of broadcast, groupcast, and unicast, and wherein the header of the MAC PDU includes second source identifier information and second destination identifier information.

According to various embodiments of the disclosure, an operation method for a sidelink, performed by a terminal, in a wireless communication system may include generating a medium access control (MAC) packet data unit (PDU) for a side link signal, generating a sidelink signal including sidelink control information (SCI) for the sidelink signal, based on the MAC PUD, and transmitting the sidelink signal, wherein the SCI includes a cast type indicator, first source identifier information, and first destination identifier information, the cast type indicator indicates one of broadcast, groupcast, and unicast, and the header of the MAC PDU includes second source identifier information and second destination identifier information.

According to various embodiments of the disclosure, an operation method for a sidelink, performed by a base station, in a wireless communication system may include receiving a resource request signal from a terminal, identifying a PC5 LINK-aggregated maximum bit rate (AMBR) corresponding to a unicast link of the terminal from quality of service (QoS) information obtained from a core network entity, and transmitting resource information allocated based on the PC5-LINK AMBR to the terminal.

Advantageous Effects of Invention

An apparatus and a method according to various embodiments of the disclosure support a scheme for processing the required amount of data with regard to each unicast link such that a direct communication system between terminals can support effectively various services having different required amounts of data.

An apparatus and a method according to various embodiments of the disclosure provide information needed by a wireless end to process packets such that a receiving terminal can process packets as fast as possible.

Advantageous effects obtainable from the present disclosure are not limited to the above-mentioned advantageous effects, and other advantageous effects not mentioned herein will be clearly understood by those skilled in the art to which the present disclosure pertains.

BEST MODE FOR CARRYING OUT THE INVENTION

Figure 1:
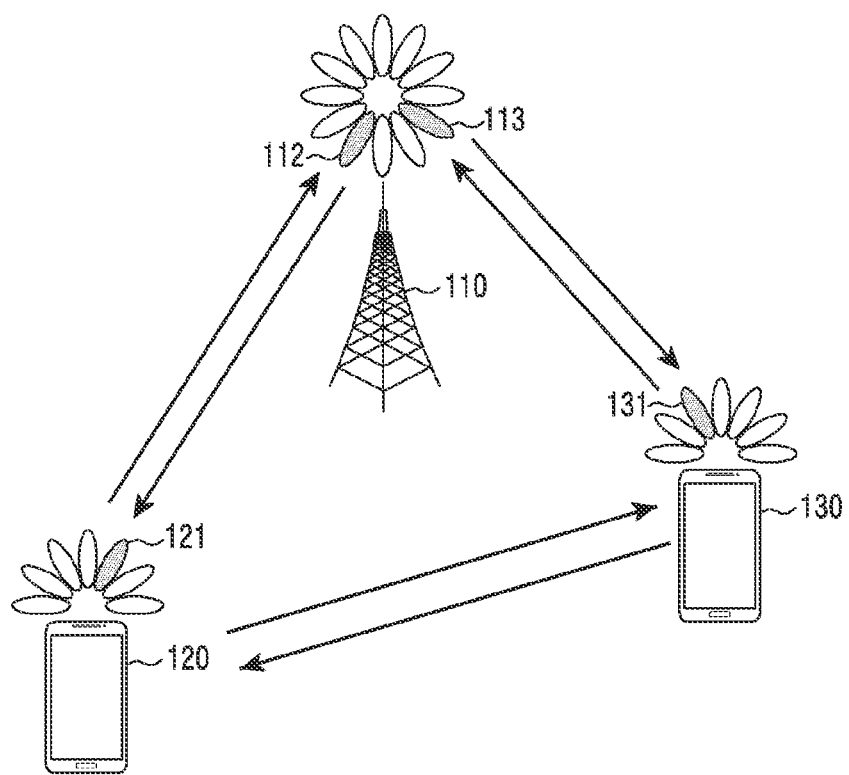
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for resource allocation in a wireless communication system. Specifically, the disclosure is provided to perform resource allocation to a terminal in sidelink communication between a terminal and a terminal, and relates to a method and apparatus for operating and allocating radio resources for unicast-based sidelink communication.

In the following description, terms referring to a signal, terms referring to a channel, terms referring to control information, terms referring to network entities, and terms referring to elements of a device are exemplified for convenience of description. Accordingly, the terms used in the disclosure are not limited, and other terms referring to objects having the equivalent technical meanings may be used.

In the following description, "physical channel" and "signal" may be used interchangeably with "data" or "control signal". For example, "physical downlink shared channel (PDSCH)" is a term that refers to a physical channel through which data is transmitted, but "PDSCH" may also be used to refer to data. That is, in the disclosure, the expression "to transmit a physical channel" may be interpreted equivalently to the expression "to transmit data or signals through a physical channel".

Hereinafter, in the disclosure, "higher-layer signaling" refers to a signal transmission method for transmission from a base station to a terminal using a downlink data channel of a physical layer or transmission from a terminal to a base station using an uplink data channel of the physical layer. Higher-layer signaling may be understood as radio resource control (RRC) signaling or media access control (MAC) control element (CE) signaling.

In addition, in the disclosure, in order to determine whether a specific condition is satisfied or fulfilled, the expression "greater than" or "less than" may be used, but this is only a description for expressing an example, and does not exclude the cases of "equal to or more than" or "equal to or less than". Conditions described as "equal to or more than" may be replaced with "greater than", conditions described as "equal to or less than" may be replaced with "less than", and conditions described as "equal to or more than, and less than" may be replaced with "greater than, and equal to or less than".

In addition, the disclosure describes embodiments using terms used in some communication standards (e.g., the 3rd-generation partnership project (3GPP)), but this is only an example for description. Embodiments of the disclosure may be easily modified and applied to other communication systems.

FIG. 1 illustrates a wireless communication system according to various embodiments of the disclosure. FIG. 1 illustrates a base station 110, a terminal 120, and a terminal 130, as a part of nodes which use a wireless channel in a wireless communication system. FIG. 1 illustrates only one base station, but other base stations identical or similar to the base station 110 may be further included.

The base station 110 is a network infrastructure for providing wireless access to the terminals 120 and 130. The base station 110 includes a coverage which is defined as a predetermined geographic area based on a distance in which signal transmission is possible. The base station 110 may be referred to as, in addition to a base station, an "access point (AP)", an "eNodeB (eNB)", a "fifth generation node (5G node)", a "next generation node B (gNB)", a "wireless point", a "transmission/reception point (TRP)" or other terms having an equivalent technical meaning thereof.

Each of the terminal 120 and the terminal 130 is a device used by a user, and performs communication with the base station 110 through a wireless channel. A link from the base station 110 to the terminal 120 or the terminal 130 is referred to as a downlink (DL), and a link from the terminal 120 or the terminal 130 to the base station 110 is referred to as an uplink (UL). In addition, the terminal 120 and the terminal 130 may communicate with each other through a wireless channel. Here, the link between the terminal 120 and the terminal 130 is called a sidelink, and the sidelink may be interchangeably used with a PC5 interface. In some cases, at least one of the terminal 120 and the terminal 130 may be operated without user involvement. That is, at least one of the terminal 120 and the terminal 130 is a device for performing machine type communication (MTC), and may not be carried by a user. Each of the terminal 120 and the terminal 130 may be referred to as, in addition to a terminal, a "user equipment (UE)", a "mobile station", a "subscriber station", or a "remote terminal", a "wireless terminal", a "user device", or other terms having an equivalent technical meaning thereof.

The base station 110, the terminal 120, and the terminal 130 may transmit or receive a radio signal in a mmWave band (e.g., 28 GHz, 30 GHz, 38 GHz, and 60 GHz). Here, in order to improve a channel gain, the base station 110, the terminal 120, and the terminal 130 may perform beamforming. Here, beamforming may include transmission beamforming and reception beamforming. That is, the base station 110, the terminal 120, and the terminal 130 may give directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, the subsequent communication is performed through a resource which is in a quasi-co-located (QCL) relationship with a resource having transmitted the serving beams 112, 113, 121, and 131.

A first antenna port and a second antenna port may be said to be in a QCL relationship if the large-scale characteristics of the channel over which a symbol on the first antenna port is transferred can be inferred from the channel over which a symbol on the second antenna port is transferred. For example, the large-scale characteristics of the channel may include at least one of delay spread, Doppler spread, Doppler shift, average gain, and average delay, and spatial receiver parameter.

The terminal 120 and the terminal 130 shown in FIG. 1 may support vehicle communication. In a case of vehicle communication, in an LTE system, the standardization for V2X technology has been completed based on a device-to-device (D2D) communication structure in 3GPP Release 14 and Release 15, and efforts are underway to develop V2X technology based on a 5G NR. The NR V2X is expected to support unicast communication, groupcast (or multicast) communication, and broadcast communication between terminals. In addition, unlike the LTE V2X that aims to transmit and receive basic safety information required for road driving of vehicles, the NR V2X aims to provide more advanced services such as platooning, advanced driving, extended sensors, and remote driving.

The V2X services may be divided into basic safety services and advanced services. The basic safety services may include detailed services such as a left-turn awareness service, a front-vehicle collision warning service, an emergency vehicle approach awareness service, a front-obstacle warning service, and an intersection traffic light information service, as well as a cooperative awareness message (CAM) service or a basic safety message (BSM) service, and V2X information may be transmitted and received using a broadcast, unicast, or groupcast transmission method. The advanced service requires a method capable of transmitting and receiving V2X information using unicast and groupcast transmission methods in addition to the broadcast transmission method, so as to enable transmission and reception of V2X information within a specific vehicle group or transmission and reception of V2X information between two vehicles as well as strengthen quality-of-service (QoS) requirements than the basic safety services. The advanced services may include detailed services such as a cluster driving service, an autonomous driving service, a remote-controlled driving service, and an extended sensor-based V2X service.

Hereinafter, a "sidelink (SL)" refers to a signal transmission/reception path between terminals, and may be interchangeably used with a PC5 interface. Hereinafter, the base station is an entity that performs resource allocation to the terminal, and may support both V2X communication and normal cellular communication, or may support only V2X communication. That is, the base station may be an NR base station (e.g., a gNB), an LTE base station (e.g., an eNB), or a road-side unit (RSU). The terminal may include, in addition to normal user equipment and a mobile station, a vehicle supporting vehicular-to-vehicular (V2V) communication, a vehicle or a pedestrian handset (e.g., a smartphone) supporting vehicular-to-pedestrian (V2P) communication, a vehicle supporting vehicular-to-network (V2N) communication, a vehicle supporting vehicular-to-infrastructure (V2I) communication, an RSU equipped with terminal functions, an RSU equipped with base station functions, and an RSU equipped with some base station functions and some terminal functions. In addition, the "V2X terminal" used in the description below may be referred to as a "terminal". That is, the terminal may be used as the V2X terminal in relation to V2X communication.

A base station and a terminal are connected through a Uu interface. Uplink (UL) refers to a radio link through which the terminal transmits data or control signals to the base station, and downlink (DL) refers to a radio link through which the base station transmits data or control signals to the terminal.

Figure 2:
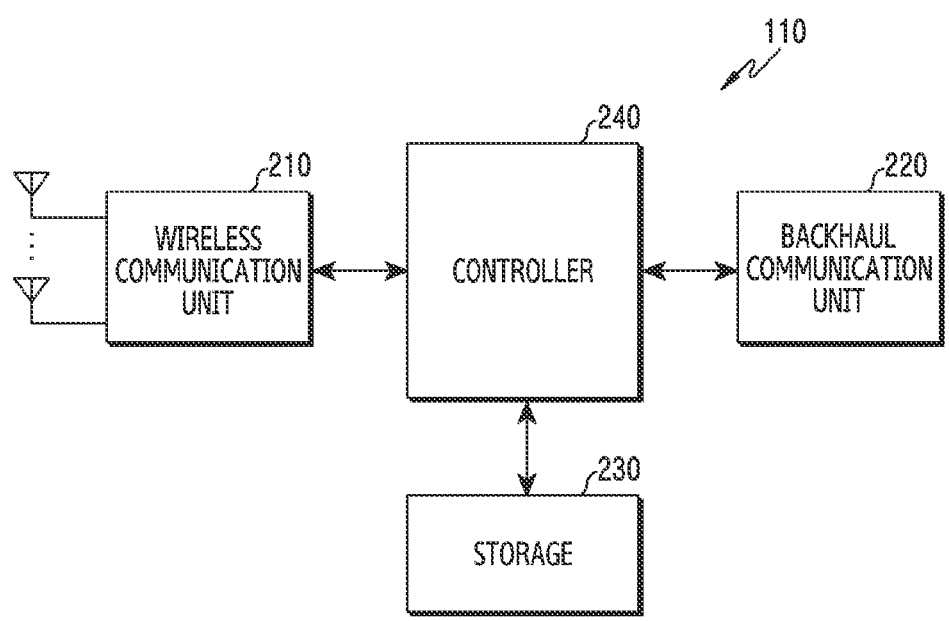
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term "unit" or terms ending with suffixes "-er" and "-or" used in the following description refer to a unit which processes at least one function or operation, and may be implemented by hardware, software, or a combination of hardware and software.

Referring to FIG. 2, the base station 110 includes a wireless communication unit 210, a backhaul communication unit 220, a storage 230, and a controller 240.

The wireless communication unit 210 performs functions for transmitting or receiving signals through a wireless channel. For example, the wireless communication unit 210 performs a conversion function between a baseband signal and a bit string according to a physical layer standard of a system. For example, at the time of data transmission, the wireless communication unit 210 generates complex symbols by encoding and modulating a transmission bit string. In addition, at the time of data reception, the wireless communication unit 210 reconstructs a reception bit string by demodulating and decoding the baseband signal.

In addition, the wireless communication unit 210 up-converts a baseband signal into a radio frequency (RF) band signal and then transmits the signal through an antenna, and down-converts an RF band signal received through the antenna into a baseband signal. To this end, the wireless communication unit 210 may include a transmission filter, a reception filter, an amplifier, a mixer, an oscillator, a digital to analog convertor (DAC), an analog to digital converter (ADC), and the like. Further, the wireless communication unit 210 may include a plurality of transmission/reception paths. Furthermore, the wireless communication unit 210 may include at least one antenna array configured by a plurality of antenna elements.

In the hardware aspect, the wireless communication unit 210 may include a digital unit and an analog unit, and the analog unit may include a plurality of sub-units according to operating power, operating frequency, and the like. The digital unit may be implemented by at least one processor (e.g., a digital signal processor (DSP)).

The wireless communication unit 210 transmits or receives signals as described above. Accordingly, all or part of the wireless communication unit 210 may be referred to as a "transmitter", a "receiver", a "transmitter/receiver", or a "transceiver". In addition, in the following description, transmission or reception performed through a wireless channel may include performing processing by the wireless communication unit 210 as described above.

The backhaul communication unit 220 provides an interface for performing communication with other nodes in a network. That is, the backhaul communication unit 220 converts a bit string, which is transmitted from the base station 110 to another node, for example, another access node, another base station, an upper node, and a core network, into a physical signal, and converts a physical signal, which is received from another node, into a bit string.

The storage 230 stores data, such as a basic program, an application program, and configuration information regarding the operation of the base station 110. The storage 230 may include a volatile memory, a nonvolatile memory, or a combination of a volatile memory and a nonvolatile memory. Then, the storage 230 provides the stored data at the request of the controller 240.

The controller 240 controls overall operations of the base station 110. For example, the controller 240 transmits or receives signals through the wireless communication unit 210 or the backhaul communication unit 220. In addition, the controller 240 records or reads data in or from the storage 230. In addition, the controller 240 may perform functions of a protocol stack required in the communication standard. According to another example of implementation, the protocol stack may be included in the wireless communication unit 210. To this end, the controller 240 may include at least one processor. According to embodiments, the controller 240 may control the base station 110 to perform operations according to embodiments to be described later.

Figure 3:
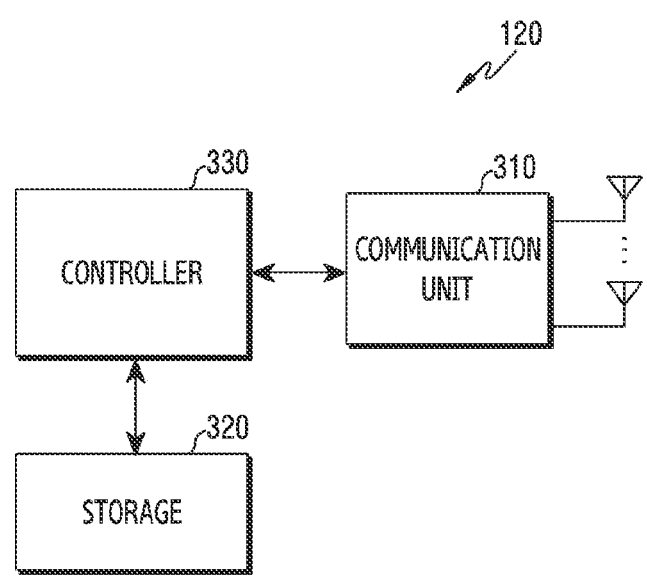
FIG. 3 illustrates a configuration of a terminal in a wireless communication system according to various embodiments of the disclosure.

FIG. 3 illustrates the configuration of a terminal in a wireless communication system according to various embodiments of the disclosure. The configuration illustrated in FIG. 3 may be understood as the configuration of the terminal 120. The term "unit" or terms ending with suffixes "-er" and "-or" used hereinafter refer to a unit which processes at least one function or operation, and may be implemented by hardware, software, or a combination of hardware and software.

Referring to FIG. 3, the terminal 120 includes a communication unit 310, a storage 320, and a controller 330.

The communication unit 310 performs functions for transmitting or receiving signals through a wireless channel. For example, the communication unit 310 performs a conversion function between a baseband signal and a bit string according to a physical layer standard of the system. For example, at the time of data transmission, the communication unit 310 generates complex symbols by encoding and modulating a transmission bit string. In addition, at the time of data reception, the communication unit 310 reconstructs the received bit string by demodulating and decoding the baseband signal. In addition, the communication unit 310 up-converts a baseband signal into an RF band signal and transmits the signal through an antenna, and down-converts an RF band signal received through the antenna into a baseband signal. For example, the communication unit 310 may include a transmission filter, a reception filter, an amplifier, a mixer, an oscillator, a DAC, and an ADC.

Further, the communication unit 310 may include a plurality of transmission/reception paths. Furthermore, the communication unit 310 may include at least one antenna array including a plurality of antenna elements. In the hardware aspect, the communication unit 310 may include a digital circuit and an analog circuit (e.g., a radio frequency integrated circuit (RFIC)). Here, the digital circuit and the analog circuit may be implemented in one package. In addition, the communication unit 310 may include a plurality of RF chains. Furthermore, the communication unit 310 may perform beamforming.

The communication unit 310 transmits or receives signals as described above. Accordingly, all or a part of the communication unit 310 may be referred to as a "transmitter", a "receiver", or a "transceiver". In addition, in the following description, transmission or reception performed through a wireless channel may include performing processing which is performed by the communication unit 310 as described above.

The storage 320 stores data, such as a basic program, an application program, and configuration information regarding the operation of the terminal 120. The storage 320 may include a volatile memory, a nonvolatile memory, or a combination of a volatile memory and a nonvolatile memory. Then, the storage 320 provides the stored data at the request of the controller 330.

The controller 330 controls overall operations of the terminal 120. For example, the controller 330 transmits or receives signals through the communication unit 310. In addition, the controller 330 records or reads data in or from the storage 320. In addition, the controller 330 may perform functions of a protocol stack required by the communication standard. To this end, the controller 330 may include at least one processor or microprocessor, or may be a part of the processor. In addition, a part of the communication unit 310 and the controller 330 may be referred to as a communication processor (CP). According to embodiments, the controller 330 may control the terminal 120 to perform operations according to embodiments to be described later.

Figure 4:
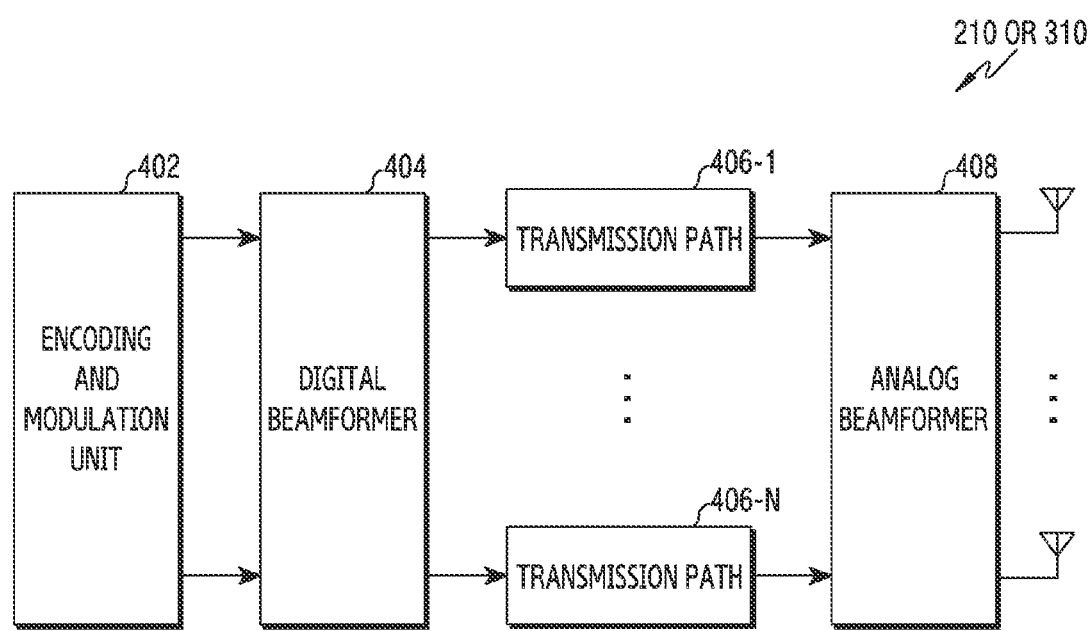
FIG. 4 illustrates a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a detailed configuration of the wireless communication unit 210 of FIG. 2 or the communication unit 310 of FIG. 3. Specifically, FIG. 4 illustrates elements for performing beamforming, as a part of the wireless communication unit 210 of FIG. 2 or as a part of the communication unit 310 of FIG. 3.

Referring to FIG. 4, the wireless communication unit 210 or the communication unit 310 includes an encoding and modulation unit 402, a digital beamformer 404, a plurality of transmission paths 406-1 to 406-N, and an analog beamformer 408.

The encoding and modulation unit 402 performs channel encoding. In order to perform channel encoding, at least one of a low density parity check (LDPC) code, a convolution code, and a polar code may be used. The encoding and modulation unit 402 generates modulation symbols by performing constellation mapping.

The digital beamformer 404 performs beamforming of a digital signal (e.g., modulation symbols). To this end, the digital beamformer 404 multiplies the modulation symbols by beamforming weights. Here, the beamforming weights are used to change the magnitude and the phase of the signal, and may be referred to as a "precoding matrix", a "precoder", or the like. The digital beamformer 404 outputs the digital-beamformed modulation symbols via the plurality of transmission paths 406-1 to 406-N. Here, according to a multiple-input multiple-output (MIMO) transmission scheme, the modulation symbols may be multiplexed, or the same modulation symbols may be provided via the plurality of transmission paths 406-1 to 406-N.

The plurality of transmission paths 406-1 to 406-N convert the digital-beamformed digital signals into analog signals. To this end, each of the plurality of transmission paths 406-1 to 406-N may include an inverse Fast Fourier transform (IFFT) operation unit, a cyclic prefix (CP) inserter, a DAC, and an up-converter. The CP inserter is for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N provide independent signal processing processes to a plurality of streams generated through digital beamforming. However, some of elements of the plurality of transmission paths 406-1 to 406-N may be used in common according to the implementation scheme.

The analog beamformer 408 performs beamforming of analog signals. To this end, the digital beamformer 404 multiplies the analog signals by beamforming weights. Here, the beamforming weights are used to change the magnitude and the phase of a signal. Specifically, the analog beamformer 440 may be variously configured according to a connection structure between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one antenna array, or may be connected to two or more antenna arrays.

Figure 5:
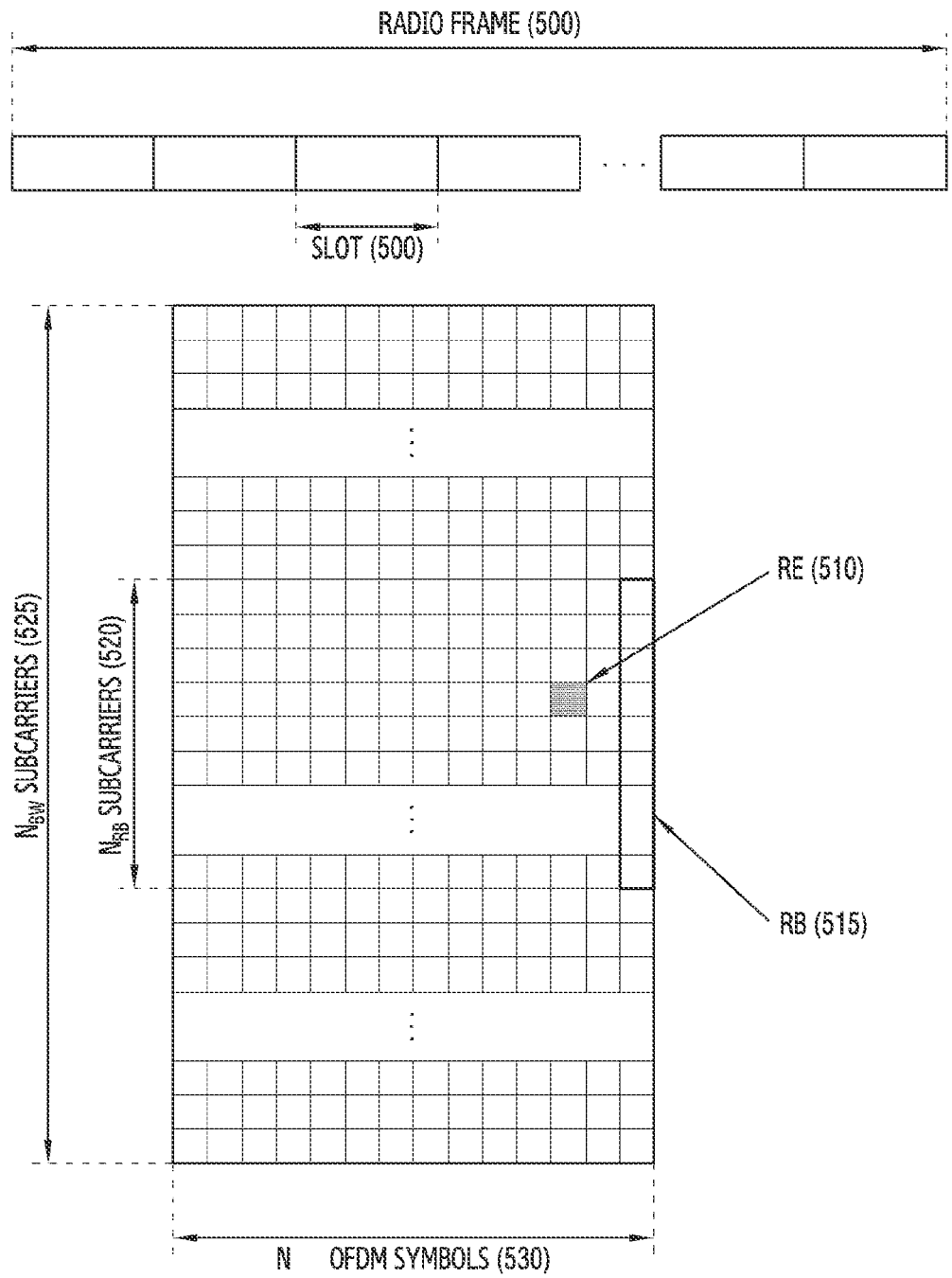
FIG. 5 illustrates the structure of radio time-frequency resources of a wireless communication system according to various embodiments of the disclosure.

FIG. 5 illustrates the structure of radio time-frequency resources of a wireless communication system according to various embodiments of the disclosure.

Referring to FIG. 5, in the radio resource domain, the horizontal axis represents a time domain and the vertical axis represents a frequency domain. The minimum transmission unit in the time domain is an OFDM symbol or a DFT-S-OFDM symbol, and Nsymb OFDM symbols or DFT-S-OFDM symbols 530 are included in one slot 505. Unlike the slot, the length of the subframe in the NR system may be defined as 1.0 ms, and the length of the radio frame 500 may be defined as 10 ms. The minimum transmission unit in the frequency domain is a subcarrier, and the bandwidth of the entire system transmission band may include a total of NBW subcarriers 525. Specific values such as Nsymb and NBW may be variably applied depending on the system.

The basic unit of the time-frequency resource domain is a resource element (RE) 510, which may be indicated by an OFDM symbol index, a DFT-S-OFDM symbol index, and a subcarrier index. A resource block (RB) 515 may be defined by consecutive NRB subcarriers 520 in the frequency domain. In general, the minimum transmission unit of data is an RB unit, and generally, Nsymb=14 and NRB=12 in the NR system.

The structure of the radio time-frequency resources as shown in FIG. 5 may be applied to a Uu interface. Further, the structure of the radio time-frequency resources as shown in FIG. 5 may be applied to a sidelink in a similar manner.

FIGS. 6A to 6D illustrate examples of a scenario for sidelink communication in a wireless communication system according to various embodiments of the disclosure.

Figure 6A:
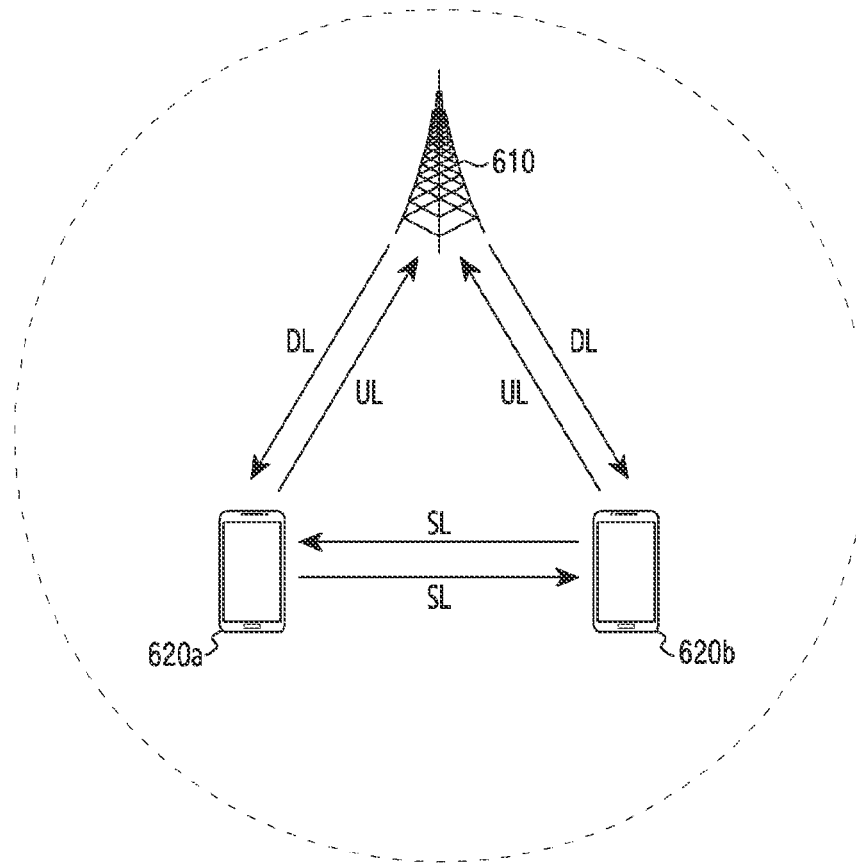
FIGS. 6A to 6D illustrate examples of a scenario for sidelink communication in a wireless communication system according to various embodiments of the disclosure.

FIG. 6A illustrates an in-coverage scenario in which sidelink terminals 620a and 620b are located within the coverage of a base station 610. The sidelink terminals 620a and 620b may receive data and control information from the base station 610 through a downlink (DL), or may transmit data and control information to the base station through an uplink (UL). Here, the data and control information may be for sidelink communication, or may be for general cellular communication rather than sidelink communication. In addition, in FIG. 6A, the sidelink terminals 620a and 620b may transmit and receive data and control information regarding sidelink communication through a sidelink.

Figure 6B:
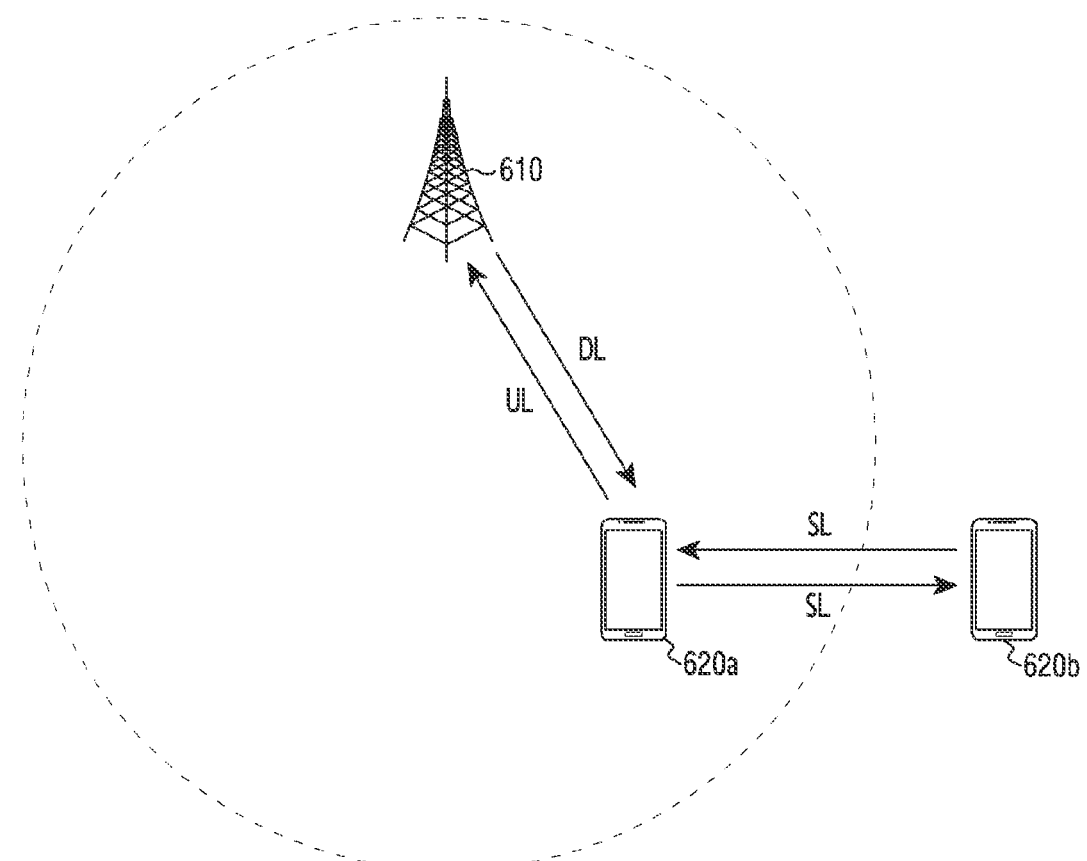

FIG. 6B illustrates partial coverage in which a first terminal 620a among the sidelink terminals is located within the coverage of the base station 610 and a second terminal 620b thereof is located outside the coverage of the base station 610. The first terminal 620a located within the coverage of the base station 610 may receive data and control information from the base station through a DL, or may transmit data and control information to the base station through an UL. The second terminal 620b located outside the coverage of the base station 610 is unable to receive data and control information from the base station through a DL, and is unable to transmit data and control information to the base station through an UL. The second terminal 620b may transmit and receive data and control information regarding sidelink communication to and from the first terminal 610a through a sidelink.

Figure 6C:
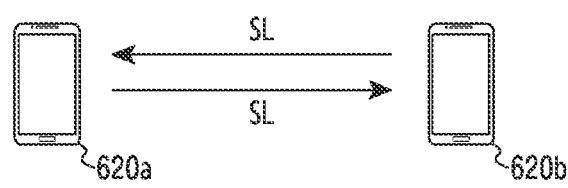

FIG. 6C illustrates an example in which sidelink terminals (e.g., a first terminal 610a and a second terminal 620b) are located outside the coverage of the base station 610. Therefore, the first terminal 620a and the second terminal 620b are unable to receive data and control information from the base station through a DL, and are unable to transmit data and control information to the base station through an UL. The first terminal 620a and the second terminal 620b may transmit and receive data and control information regarding sidelink communication through a sidelink.

Figure 6D:
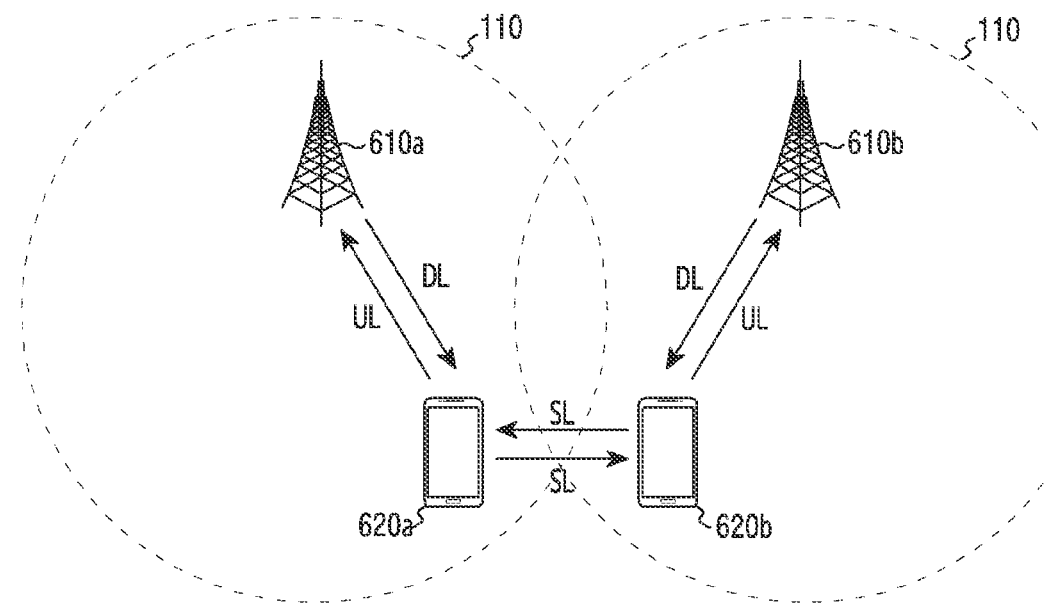

FIG. 6D illustrates a case of performing inter-cell sidelink communication in which a first terminal 620a and a second terminal 620b, which perform sidelink communication, are in connected (e.g., an RRC connected state) with different base stations from each other (e.g., a first base station 610a and a second base station 610b) or are camping thereon (e.g., an RRC connection release state, that is, an RRC idle state). Here, the first terminal 620a may be a sidelink transmission terminal, and the second terminal 620b may be a sidelink reception terminal. Alternatively, the first terminal 620a may be a sidelink reception terminal, and the second terminal 620b may be a sidelink transmission terminal. The first terminal 620a may receive a system information block (SIB) dedicated to a sidelink from the base station 610a to which the first terminal itself has accessed (or on which the first terminal itself is camping), and the second terminal 620b may receive an SIB dedicated to a sidelink from another base station 610b to which the second terminal itself has accessed (or on which the second terminal itself is camping). Here, information regarding the SIB dedicated to a sidelink, which is received by the first terminal 620a, may be different from information regarding the SIB dedicated to a sidelink, which is received by the second terminal 620b. Accordingly, it is necessary to unify the information in order to perform sidelink communication between the terminals located in different cells.

Although examples of the sidelink system configured with two terminals (e.g., the first terminal 610a and the second terminal 620b) have been described in the examples in FIGS. 6A to 6D for convenience of description, the disclosure is not limited thereto, and may be applied to a sidelink system in which three or more terminals participate. In addition, the UL or the DL between the base station 610 and the sidelink terminals may be referred to as a "Uu interface", and the sidelink between the sidelink terminals may be referred to as a "PC-5 interface". In the following description, the UL, the DL, the Uu interface, the sidelink, and the PC-5 may be used interchangeably with each other.

Meanwhile, in the disclosure, the terminal may refer to a vehicle supporting vehicular-to-vehicular (V2V) communication, a vehicle or pedestrian handset (e.g., a smartphone) supporting vehicular-to-pedestrian (V2P) communication, a vehicle supporting vehicular-to-network (V2N) communication, or a vehicle supporting vehicular-to-infrastructure (V2I) communication. In addition, in the disclosure, the terminal may refer to a road-side unit (RSU) equipped with terminal functions, an RSU equipped with base station functions, or an RSU equipped with some of base station functions and some of terminal functions.

Figure 7A:
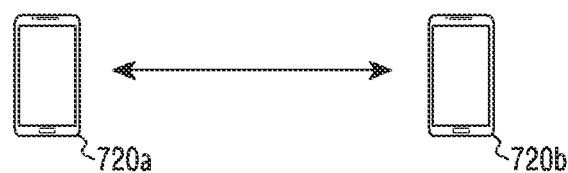
FIGS. 7A and 7B illustrate examples of a transmission method of sidelink communication in a wireless communication system according to various embodiments of the disclosure.
Figure 7B:
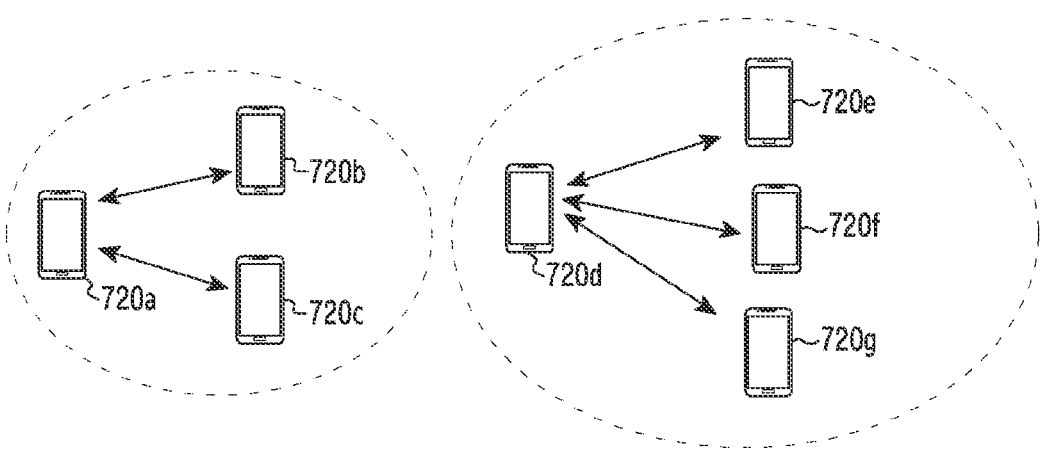

FIGS. 7A and 7B illustrate examples of a transmission method of sidelink communication in a wireless communication system according to various embodiments of the disclosure. FIG. 7A illustrates a unicast method, and FIG. 7B illustrates a groupcast method.

As shown in FIG. 7A, a transmission terminal 720a and a reception terminal 720b may perform one-to-one communication. The transmission method shown in FIG. 7A may be referred to as "unicast communication". As shown in FIG. 7B, a transmission terminal 720a or 720d and reception terminals 720b, 720c, 720e, 720f, and 720g may perform one-to-many communication. The transmission method shown in FIG. 7B may be referred to as "groupcast communication" or "multicast communication". In FIG. 7B, a first terminal 720a, a second terminal 720b, and a third terminal 720c may configure one group, and terminals in a group (the first terminal 720a, second terminal 720b, and third terminal 720c) may perform groupcast communication. A fourth terminal 720d, a fifth terminal 720e, a sixth terminal 720f, and a seventh terminal 720g may configure another group, and terminals in a group (the fourth terminal 720d, fifth terminal 720e, sixth terminal 720f, and seventh terminal 720g) may perform groupcast communication. The terminals may perform groupcast communication within the group to which they belong, and may perform unicast, groupcast, or broadcast communication with at least one other terminal that belongs to a different group. Although two groups are illustrated in FIG. 7B, the disclosure is not limited thereto, and may be applied to the case in which a larger number of groups are configured.

Meanwhile, although not shown in FIG. 7A or 7B, sidelink terminals may perform broadcast communication. The broadcast communication refers to a method in which all sidelink terminals receive data and control information transmitted by the sidelink transmission terminal through a sidelink. For example, if the first terminal 720a is a transmission terminal in FIG. 7B, the remaining terminals 720b, 720c, 720d, 720e, 720f, and 720g may receive data and control information transmitted by the first terminal 720a.

The sidelink unicast communication, the groupcast communication, and the broadcast communication described above may be supported by an in-coverage scenario, a partial-coverage scenario, or an out-of-coverage scenario.

In a case of NR sidelink, unlike in the LTE sidelink, the support for a transmission scheme in which a vehicle terminal transmits data to only one specific terminal through the unicast communication and a transmission scheme in which a vehicle terminal transmits data to a plurality of specific terminals through the groupcast communication may be considered. For example, the unicast and groupcast technologies may be usefully applied to the case of a service scenario such as platooning in which two or more vehicles are connected to a single network and move together in a cluster. Specifically, the unicast communication may be used for a leader terminal of a group connected by platooning to control one specific terminal, and the groupcast communication may be used for the leader terminal to simultaneously control the group including a plurality of specific terminals.

The base station or the terminal may perform resource allocation for sidelink communication (i.e., V2X). Resource allocation for sidelink transmission may be performed within a resource pool defined in the time and frequency domains. The resource pool may be configured within a bandwidth part (BWP) within the frequency domain. Specifically, the following methods may be used for resource allocation.

(1) Mode 1 Resource Allocation—Scheduled Resource Allocation

Scheduled resource allocation is a method in which a base station allocates resources used for sidelink transmission to RRC-connected terminals in a dedicated scheduling method. The base station may allocate resources to terminals within a coverage. The base station may transmit resource allocation information to a transmission terminal for sidelink transmission. That is, the base station may schedule a resource for sidelink transmission and transmit a result of scheduling to the terminal. The scheduled resource allocation method may be effective for interference management and resource pool management (dynamic allocation and/or semi-persistent transmission) because the base station is able to manage the resources of the sidelink. If a terminal in an RRC connected mode has data to be transmitted to the other terminal(s), the terminal may transmit, to a base station, information indicating that there is data to be transmitted to other terminals by using an RRC message or a MAC control element (hereinafter, CE). For example, the RRC message which the terminal transmits to the base station may be a sidelink terminal information message (sidelinkUEInformation) or a terminal assistance information message (UEAssistanceInformation), and the MAC CE may correspond to a buffer status report (BSR) MAC CE, which includes at least one of an indicator indicating a BSR for V2X communication and information regarding the size of data buffered for sidelink communication, a scheduling request (SR), and the like.

(2) Mode 2 Resource Allocation—UE Autonomous Resource Selection

Secondly, UE autonomous resource selection is a method in which a sidelink transmission/reception resource pool for V2X is provided to a terminal through system information, an RRC message (for example, an RRCReconfiguration message or a PC5-RRC message), or pre-configured information, and the terminal selects a resource pool and resources according to a predetermined rule. The UE autonomous resource selection may correspond to one or multiple of the following resource allocation methods.

- A UE autonomously selects sidelink resources for transmission.
- A UE assists sidelink resource selection for other terminals.
- A UE is configured with an NR-configured grant for sidelink transmission.
- A UE may schedule sidelink transmission of other terminals.

The resource selection method of the terminal may include zone mapping, sensing-based resource selection, and random selection.

Additionally, even if a terminal is located in the coverage of the base station, resource allocation or resource selection may not be performed according to the scheduled resource allocation or the UE autonomous resource selection mode. Here, the terminal may perform V2X sidelink communication through a preconfigured sidelink transmission/reception resource pool or a sidelink transmission/reception resource pool configured for exceptional situations (exceptional resource pool).

In addition, if the terminals for V2X communication are located outside the coverage of the base station, the terminals may perform V2X sidelink communication through a preconfigured sidelink transmission/reception resource pool.

Sidelink radio bearer (SLRB) configuration and SLRBs for transmission of sidelink flow or packets may be mapped to a SL logical channel (LC), and the SL logical channel may be mapped to a SL logical channel group (LCG). The SLRB configuration and the SLRBs may be distinguished according to a combination of a source index, a destination index, a cast type, a quality of service (QoS) flow identifier (QFI)/ProSe flow identifier (PFI) or a PC5 flow identifier (PFI), and a priority.

1. PC5-LINK-AMBR Operation Scheme

A direct communication system between terminals through a sidelink may support data transmission/reception through a guaranteed bit rate (GBR) QoS flow, a non-guaranteed bit rate (non-GBR) QoS flow, and a delay critical GBR QoS flow. With regard to the GBR QoS flow, the base station or terminal may process sidelink radio resource allocation based on a guaranteed flow bit rate (GFBR) and a maximum flow bit rate (MFBR). With regard to the non-GBR QoS flow, the base station or terminal may process sidelink radio resource allocation based on a UE PC5 aggregated maximum bit rate (UE-PC5-AMBR) and a PC5 LINK aggregated maximum bit rate (PC5-LINK-AMBR). With regard to the delay critical GBR QoS flow, the base station or terminal may process sidelink radio resource allocation based on the UE-PC5-AMBR, or may process sidelink radio resource allocation based on the aggregated maximum bit rate (AMBR) used for the delay critical GBR QoS flow. The case in which the base station processes sidelink radio resource allocation corresponds to the case of mode 1 resource allocation, and the case in which the terminal processes sidelink radio resource allocation corresponds to the case of mode 2 resource allocation. In other words, in mode 1 resource allocation, the base station may perform radio resource allocation for sidelink transmission of the terminal. In mode 2 resource allocation, the terminal may perform radio resource allocation for sidelink transmission.

The PC5-LINK-AMBR may be configured to have the same value for each PC5 unicast link and operated. Therefore, operation can be performed such that the sum of the data rate of each PC5 flow belonging to PC5 unicast link A is the same as the sum of the data rate of each PC5 flow belonging to PC5 unicast link B. The PC5 unicast link may be configured such that the V2X application of the terminal is to use the unicast type sidelink communication and when a PC5 flow for transmission of a packet generated in the V2X application is configured, the PC5 unicast link may be mapped to the PC5 flow and managed by the terminal. The PC5-LINK-AMBR of the PC5 unicast link may be configured in the terminal itself, may be configured in a V2X application server, or may be configured in an entity managing the subscription of the terminal, and the terminal may store the PC5-LINK-AMBR.

In mode 2 resource allocation, the terminal may store PC5-LINK-AMBR information for each PC5 unicast link. When a packet to be transmitted with regard to a random unicast PC5 flow is generated, the terminal may determine a PC5 unicast link corresponding to the PC5 flow in order to obtain resources for transmission of the packet, and may check (i.e., identify) PC5-LINK-AMBR for the unicast link. The terminal may allocate resources for transmission of the packet based on PC5-LINK-AMBR. For example, the terminal may allocate resources for transmission of the packet at a level not exceeding PC5-LINK-AMBR.

In mode 1 resource allocation, a base station may receive, from a terminal, a request for allocation of resources for transmission of a packet belonging to a random unicast PC5 flow. The base station may check (i.e., identify) a PC5 unicast link corresponding to the PC5 flow and a PC5-LINK-AMBR for the link in order to allocate resources for transmission of the packet. The base station may allocate resources for transmission of the packet based on PC5-LINK-AMBR. For example, the base station may allocate resources for transmission of the packet to the terminal at a level not exceeding PC5-LINK-AMBR. Here, in order for the base station to identify the PC5-LINK-AMBR for the PC5 unicast link, the base station needs to know a PC5 unicast link to which the PC5 flow of the terminal is mapped and PC5-LINK-AMBR information of the corresponding PC5 unicast link. Next, a scheme in which abase station acquires a PC5 unicast link of a terminal and PC5-LINK-AMBR information of the corresponding PC5 unicast link will be described with reference to various embodiments.

Figure 8A:
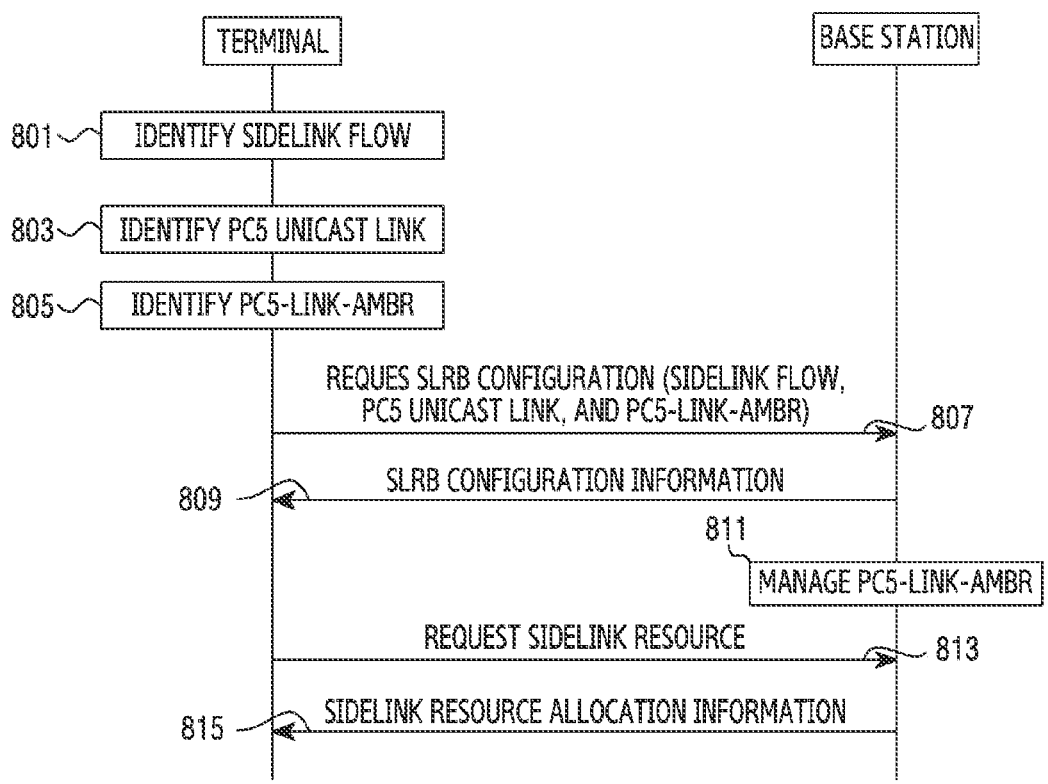
FIGS. 8A to 8E illustrate a signal flow between a terminal and a base station for unicast-based sidelink radio resource allocation according to various embodiments of the disclosure.
Figure 8B:
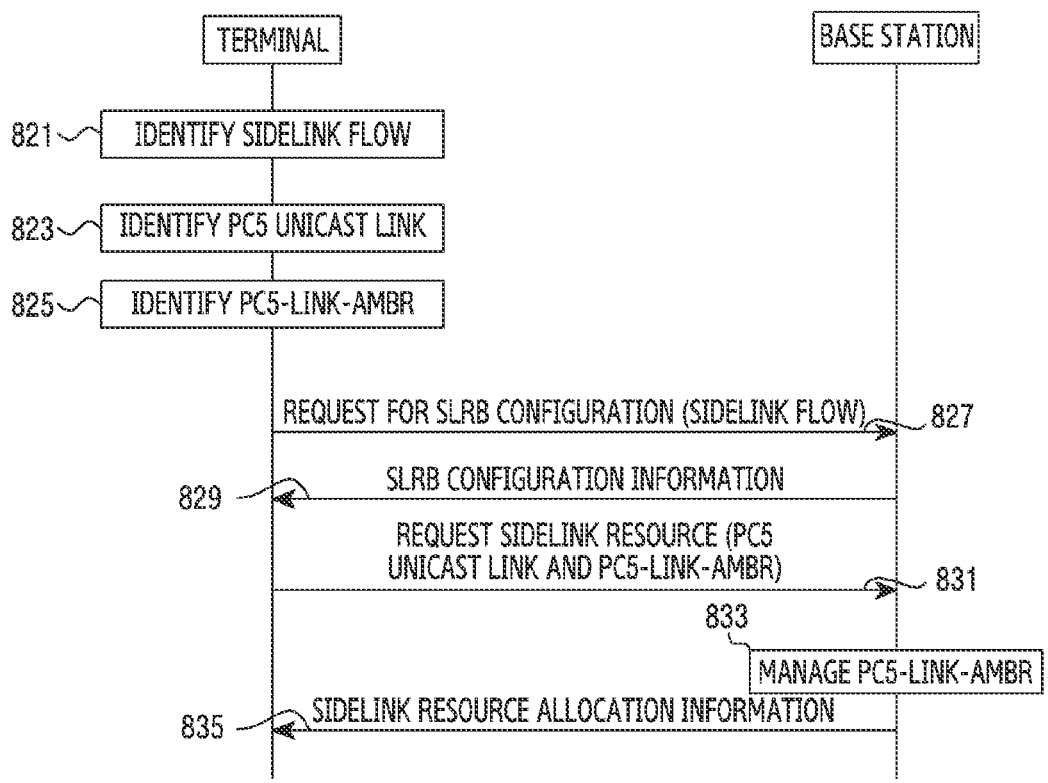
Figure 8C:
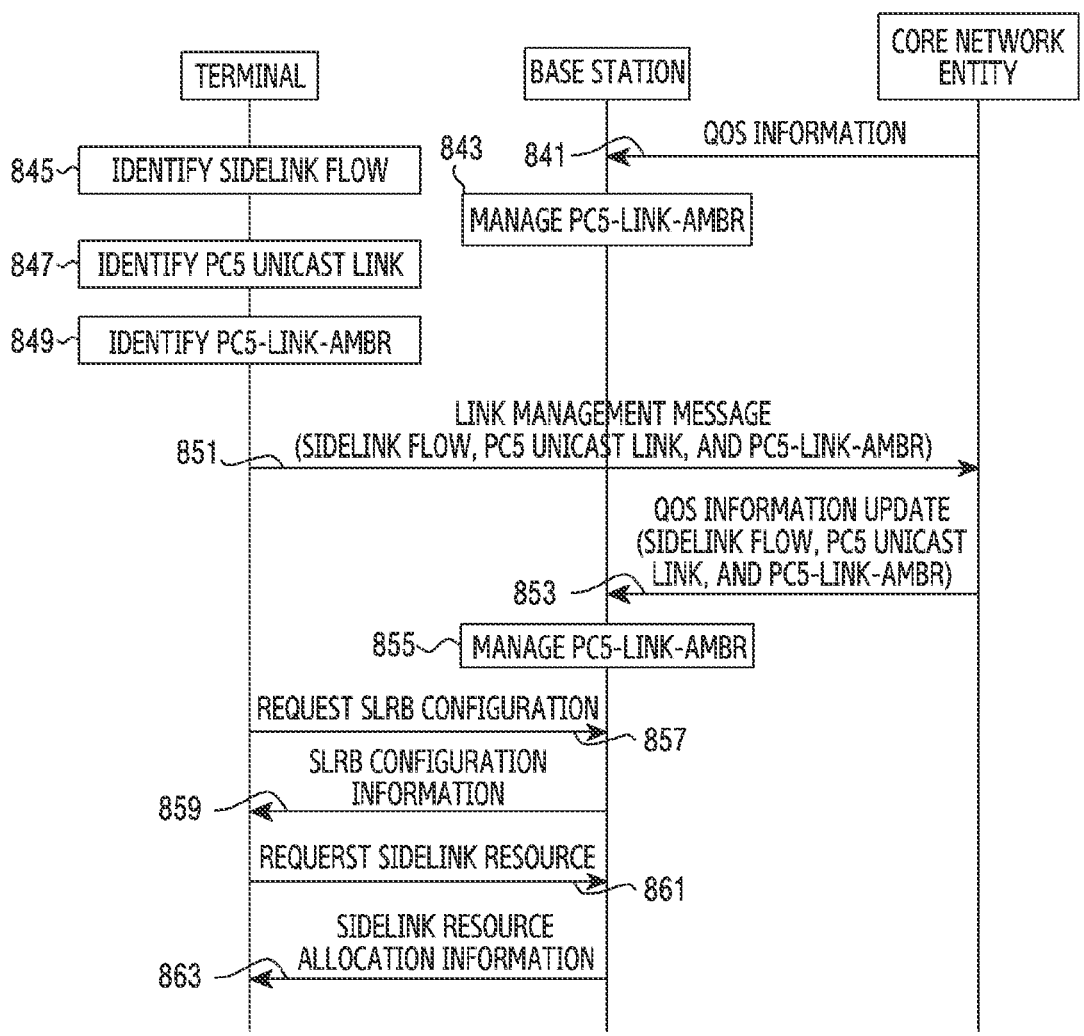
Figure 8D:
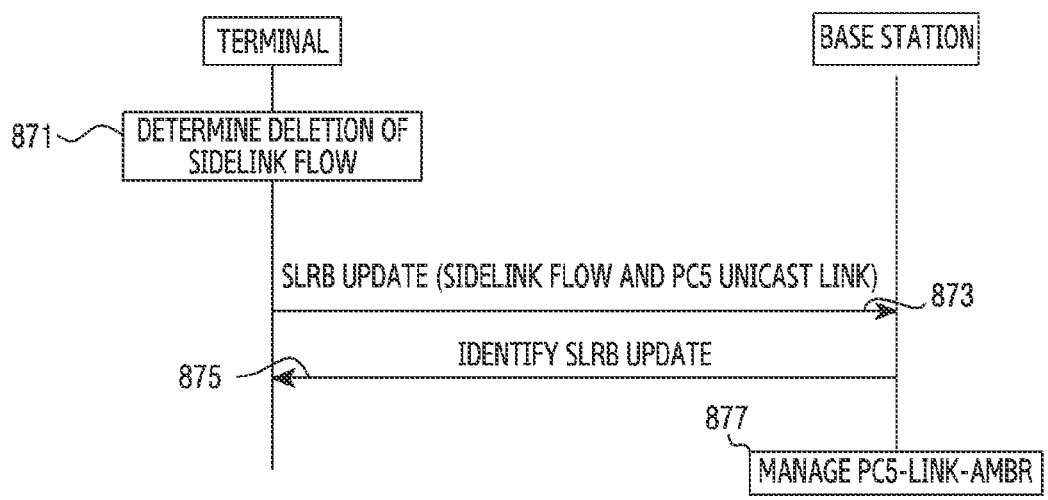
Figure 8E:
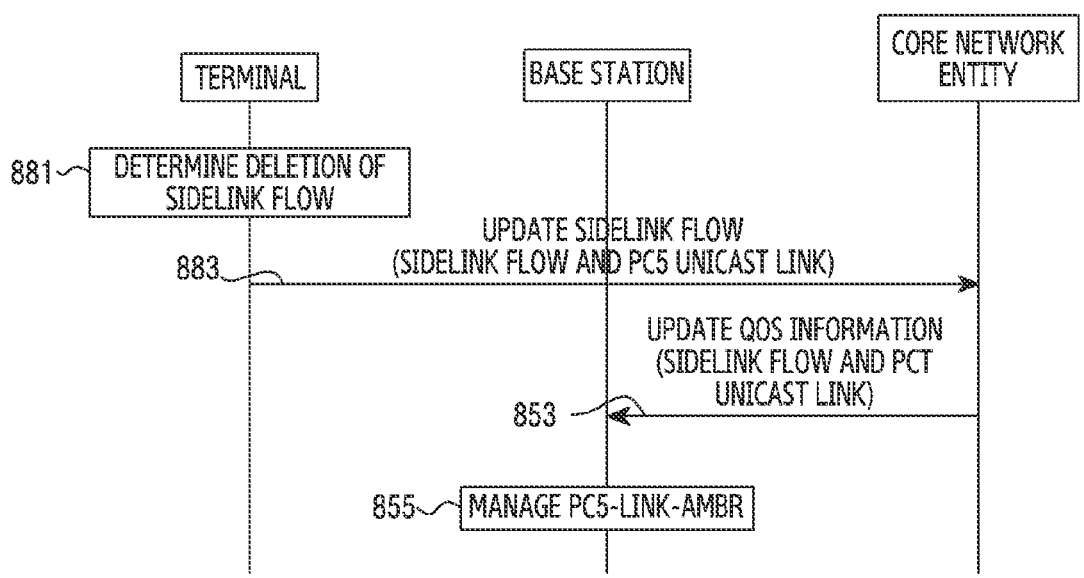

FIGS. 8A to 8E illustrate a signal flow between a terminal and a base station for unicast-based sidelink radio resource allocation according to various embodiments of the disclosure. FIGS. 8A to 8C illustrate embodiments in which a base station acquires PC5-LINK-AMBR information when a unicast flow is generated and unicast link information to which the unicast flow is mapped is updated. FIGS. 8D and 8E illustrate embodiments in which a base station acquires PC5-LINK-AMBR information when a unicast flow is deleted and unicast link information to which the unicast flow is mapped is updated.

In FIG. 8A, a scheme for obtaining PC5-LINK-AMBR information based on a SLRB configuration request is described. Referring to FIG. 8A, in operation 801, the terminal may identify a sidelink flow. The sidelink flow may be used for service management (e.g., quality-of-service (QoS) management) through sidelink communication. One or more sidelink flows may correspond to one PC5 unicast link. The sidelink flow may be referred to as a PC5 flow, a PC5 QoS flow, or a sidelink QoS flow. The terminal may determine that a sidelink flow is generated. The terminal may identify the generated sidelink flow. For example, the terminal may identify a newly generated sidelink flow, that is, a new flow. In addition, for example, the terminal may identify a sidelink flow requiring reconfiguration in response that the state of the terminal is changed to RRC_CONNECTED.

In operation 803, the terminal may identify a PC5 unicast link. In order to manage unicast-type sidelink communication, a PC5 unicast link may be used. The PC5 unicast link may be mapped to one or more sidelink flows. The PC5 unicast link may be referred to as a PC5 link, a sidelink unicast link, or the like. The terminal may identify the PC5 unicast link mapped to the sidelink flow.

In operation 805, the terminal may identify a PC5-LINK-AMBR. The terminal may identify the PC5-LINK-AMBR based on at least one of a sidelink flow and a PC5 unicast link. That is, the terminal may manage information regarding the sidelink flow and PC5 unicast link. The terminal may identify the PC5-LINK-AMBR of the PC5 unicast link to which the sidelink flow is mapped.

In operation 807, the terminal may transmit a signal for requesting sidelink radio bearer (SLRB) configuration information (hereinafter, SLRB configuration request signal). The terminal may transmit the SLRB configuration request signal in order to configure SLRB information enabling transmission and reception of a packet corresponding to the sidelink flow. When the terminal and the base station are in an RRC CONNECTED state, the terminal may transmit the SLRB configuration request signal to the base station.

According to various embodiments, a terminal may transmit sidelink flow information and PC5 unicast link information mapped thereto to a base station while requesting SLRB configuration information regarding a sidelink flow. The terminal may include information regarding a sidelink flow and PC5 unicast link information mapped to the sidelink flow in the configuration request signal. For example, the SLRB configuration request signal may include at least one of a destination identifier, a source identifier, an identifier of a sidelink flow (hereinafter, a sidelink flow identifier), a QoS profile of a sidelink flow (the profile may correspond to 5G QoS indicator (5QI), PC5 5QI (PQI), or QoS requirements), an identifier of a PC5 unicast link (hereinafter, a PC5 unicast link identifier), and PC5-LINK-AMBR for a PC5 unicast link. According to an embodiment, if it is determined that a terminal has previously transferred PC5-LINK-AMBR to the base station and the value has not changed, the terminal may transmit an SLRB configuration request signal to the base station without PC5-LINK-AMBR. That is, the PC5-LINK-AMBR for the PC5 unicast link mapped to the sidelink flow may be omitted from the SLRB configuration request signal.

The SLRB configuration request signal may include one or more sidelink flows and information regarding a PC5 unicast link mapped to each sidelink flow. Here, at least one sidelink flow may be mapped to one PC5 unicast link.

In operation 809, the base station may transmit SLRB configuration information to the terminal. The base station may transmit the SLRB configuration information to the terminal in response to the request performed in operation 807. The SLRB configuration information may include at least one of an SLRB identifier mapped to the sidelink flow, radio parameter information regarding the SLRB (e.g., at least one of service data adaptation protocol (SDAP) configuration, packet data convergence protocol (PDCP) configuration, radio link control (RLC) configuration, medium access control (MAC) configuration, and physical (PHY) configuration), a logical channel identifier, and a logical channel identifier group.

In operation 811, the base station may manage PC5-LINK-AMBR information. The base station may manage PC5-LINK-AMBR information based on the SLRB configuration request signal received from the terminal. Here, the PC5-LINK-AMBR information may refer to information regarding a relationship between a sidelink flow of a terminal, an SLRB, a logical channel, a PC5 unicast link, and AMBR of the PC5 unicast link. The base station may update the SLRB configuration regarding the sidelink flow and the PC5-LINK-AMBR information. If the base station receives at least one of a sidelink flow, a PC5 unicast link mapped to the sidelink flow, or a PC5-LINK-AMBR from the terminal, the base station may manage the sidelink flow, the PC5 unicast link, the SLRB, the logical channel, and PC5-LINK-AMBR mapping information regarding thereto. The information may be used when the terminal requests sidelink resource allocation from the base station.

In operation 813, the terminal may transmit a signal for requesting a resource for the sidelink (hereinafter, a sidelink resource request signal) to the base station. The terminal may request the base station to allocate resources for transmission of a packet belonging to the sidelink flow. The sidelink resource request signal may include at least one of a destination identifier, a source identifier, a logical channel identifier, and buffer status information.

In operation 815, the base station may transmit resource allocation information for sidelink to the terminal. When receiving the sidelink resource request signal from the terminal, the base station may perform sidelink resource allocation based on at least one piece of information among a destination identifier, a source identifier, and a logical channel identifier, and information managed in operation 811 (e.g., SLRB configuration and PC5-LINK-AMBR information). That is, the base station may perform scheduling. The base station may determine that the request is a resource request for a sidelink unicast link, and may determine the identifier of a corresponding PC5 unicast link. The base station may determine a sidelink resource to be allocated to the terminal based on the PC5-LINK-AMBR corresponding to the PC5 unicast link. When it is determined to allocate a sidelink resource, the base station may transmit allocation information regarding the sidelink resource, i.e., sidelink resource allocation information, to the terminal.

In FIG. 8B, a scheme for obtaining PC5-LINK-AMBR information based on a sidelink resource request is described. Referring to FIG. 8B, in operation 821, the terminal may identify a sidelink flow. The terminal may determine that a sidelink flow is generated. The terminal may identify the generated sidelink flow. The sidelink flow may include a new flow or a sidelink flow requiring reconfiguration because the state of the terminal is changed to be in an RRC_CONNECTED. Since operation 821 corresponds to operation 801 of FIG. 8A, the same or similar description thereof may be omitted.

In operation 823, the terminal may identify a PC5 unicast link. The terminal may identify a PC5 unicast link mapped to the sidelink flow.

In operation 825, the terminal may identify the PC5-LINK-AMBR. The terminal may identify the PC5-LINK-AMBR based on at least one of a sidelink flow or a PC5 unicast link. That is, the terminal may manage information regarding the sidelink flow and PC5 unicast link. Here, the terminal may identify the PC5-LINK-AMBR of the PC5 unicast link to which the sidelink flow is mapped.

In operation 827, the terminal may transmit a signal for requesting sidelink radio bearer (SLRB) configuration information (hereinafter, SLRB configuration request signal). The terminal may transmit the SLRB configuration request signal in order to configure SLRB information enabling transmission and reception of a packet corresponding to the sidelink flow. When the terminal and the base station are in an RRC CONNECTED state, the terminal may transmit the SLRB configuration request signal to the base station. The SLRB configuration request signal may include at least one of a destination identifier, a source identifier, a sidelink flow identifier, and a QoS profile of a sidelink flow (the profile may correspond to 5QI, PQI, or QoS requirements). The SLRB configuration request signal may include multiple pieces of sidelink flow information.

In operation 829, the base station may transmit SLRB configuration information to the terminal. The base station may transmit SLRB configuration information to the terminal in response to the request performed in operation 827. The SLRB configuration information may include at least one of an SLRB identifier mapped to the sidelink flow, radio parameter information regarding the SLRB (e.g., at least one of SDAP configuration, PDCP configuration, RLC configuration, MAC configuration, and PHY configuration), a logical channel identifier, and a logical channel identifier group.

In operation 831, the terminal may transmit a signal for requesting a resource for the sidelink (hereinafter, a sidelink resource request signal) to the base station. The terminal may request the base station to allocate resources for transmission of the packet belonging to the sidelink flow.

According to various embodiments, the terminal may transmit PC5 unicast link information mapped to a sidelink flow together with the sidelink resource request signal. That is, the terminal may transmit the sidelink resource request signal including information regarding the PC5 unicast link mapped to the sidelink flow and information regarding the AMBR of the PC5 unicast link to the base station. The sidelink resource request signal may include at least one of a destination identifier, a source identifier, a logical channel identifier, buffer status information, a PC5 unicast link identifier, and a PC5-LINK-AMBR. According to an embodiment, the PC5-LINK-AMBR for the PC5 unicast link mapped to the sidelink flow may be omitted from the sidelink resource request signal if it is determined that a terminal has previously transferred PC5-LINK-AMBR to the base station and the value has not changed.

In operation 833, the base station may manage PC5-LINK-AMBR information. The base station may manage PC5-LINK-AMBR information based on the sidelink resource request signal received from the terminal. Here, the PC5-LINK-AMBR information may refer to information regarding a relationship between a sidelink flow of a terminal, an SLRB, a logical channel, a PC5 unicast link, and AMBR of the PC5 unicast link. In addition, the base station may update a sidelink flow, a PC5 unicast link mapped thereto, and PC5-LINK-AMBR information. The base station may manage the destination identifier, the sidelink flow, the unicast link, the SLRB, the logical channel, and the PC5-LINK-AMBR mapping information regarding thereto.

In operation 835, the base station may transmit resource allocation information for sidelink to the terminal. The base station may perform sidelink resource allocation based on at least one information among a destination identifier, a source identifier, and a logical channel identifier included in the sidelink resource request signal of the terminal and the information managed in operation 833 (e.g., PC5-LINK-AMBR information). That is, the base station may perform scheduling. The base station may determine that the request is a resource request for a sidelink unicast link, and may determine the identifier of a corresponding PC5 unicast link. The base station may determine a sidelink resource to be allocated to the terminal based on the PC5-LINK-AMBR corresponding to the PC5 unicast link. When it is determined to allocate the sidelink resource, the base station may transmit sidelink resource allocation information to the terminal.

Meanwhile, in FIG. 8B, the identification of the PC5-LINK-AMBR in operation 825 is illustrated as being performed after the SLRB configuration request in operation 827, but the disclosure is not limited thereto. According to an embodiment, the terminal may identify a PC5-LINK-AMBR corresponding to the unicast link after receiving the SLRB configuration information, that is, after operation 829, before transmitting a sidelink resource request signal, and may include the corresponding PC5-LINK-ABMR in the sidelink resource request signal so as to transmit the sidelink resource request signal to the base station.

Unlike FIG. 8B, as another embodiment of the disclosure, the identifier for a PC5 unicast link and PC5-LINK-AMBR information may be separated and transmitted. When transmitting the SLRB configuration request signal in operation 827, the terminal may transmit PC5-LINK-AMBR information to be applied to each sidelink unicast link. In addition, the sidelink resource request signal of operation 831 may include PC5 unicast link identifier information in addition to at least one of a destination identifier, a source identifier, a logical channel identifier, and buffer status information. Based on the sidelink flow, SLRB, and logical channel information including the PC5-LINK-AMBR information in operation 827 and the destination identifier, source identifier, logical channel identifier, and PC5 unicast link identifier information in operation 831, the base station may determine that the request is a resource request for a PC5 unicast link, and may determine the identifier of a sidelink unicast link. The base station may determine a sidelink resource to be allocated to the terminal based on the PC5-LINK-AMBR corresponding to the unicast link. When it is determined to allocate the sidelink resource, the base station may transmit sidelink resource allocation information to the terminal.

In FIG. 8C, a QoS information-based PC5-LINK-AMBR information acquisition scheme is described. When a terminal performs service registration, a core network entity may manage a QoS profile of the terminal, a subscription profile, and the like. Here, the core network entity is the entity for QoS management of the terminal, and may be a network entity in charge of a policy and control function (PCF) or a network entity that is connected to a network entity in charge of the PCF to perform QoS management (e.g., a network entity in charge of an access and mobility management function (AMF) or a network entity in charge of a session management function (SMF)). Here, the QoS profile of the terminal may include information used when the terminal transmits/receives a service through a sidelink, and may include PC5-LINK-AMBR information regarding a sidelink unicast link according to an embodiment of the disclosure.

Referring to FIG. 8C, in operation 841, the core network entity may transmit QoS information to the base station. Here, the QoS information may be information related to a QoS profile of a sidelink of the terminal. The core network entity may transfer sidelink-related QoS profile information of the terminal to the base station serving the terminal. The QoS information may include PC5-LINK-AMBR for sidelink unicast link.

In operation 843, the base station may manage PC5-LINK-AMBR information. The base station may manage PC5-LINK-AMBR information based on the QoS information received from the core network entity. Here, the PC5-LINK-AMBR information may refer to information regarding a relationship between a sidelink flow of a terminal, an SLRB, a logical channel, a PC5 unicast link, and AMBR of the PC5 unicast link. The base station may update the PC5-LINK-AMBR information of the sidelink unicast link for the terminal.

In operation 845, the terminal may identify a sidelink flow. The terminal may determine that the sidelink flow is generated. The terminal may identify the generated sidelink flow. The sidelink flow may include a new flow or a sidelink flow requiring reconfiguration because the state of the terminal is changed to be RRC_CONNECTED.

In operation 847, the terminal may identify a PC5 unicast link. The terminal may identify a PC5 unicast link mapped to the sidelink flow.

In operation 849, the terminal may identify the PC5-LINK-AMBR. The terminal may identify the PC5-LINK-AMBR based on at least one of a sidelink flow and a PC5 unicast link. The terminal may manage information regarding the sidelink flow and PC5 unicast link. The terminal may identify the PC5-LINK-AMBR of the PC5 unicast link to which the sidelink flow is mapped.

In operation 851, the terminal may transmit a link management message to the core network entity. A link management message according to various embodiments may include information related to a PC5 unicast link or a sidelink flow of a terminal, which is required to manage QoS of a sidelink of the terminal. That is, the terminal may transmit sidelink flow information and information regarding a PC5 unicast link mapped to the sidelink flow to the core network entity. According to various embodiments, the link management message may include information regarding at least one of a sidelink flow identifier, a PC5 unicast link identifier, and a PC5-LINK-AMBR corresponding to a PC5 unicast link. According to an embodiment, the PC5-LINK-AMBR for the PC5 unicast link mapped to the sidelink flow may be omitted from the link management message if it is determined that the terminal has previously transferred the same to the core network entity and the value thereof has not changed. The link management message may include one or more sidelink flows and information regarding a PC5 unicast link corresponding to each sidelink flow. Here, at least one sidelink flow may be mapped to one PC5 unicast link.

In operation 853, the core network entity may update QoS information. The core network entity may update QoS information regarding the sidelink of the terminal based on the link management message received in operation 851. The core network entity may transfer sidelink QoS profile information to the base station. The transferred QoS profile information may include information regarding at least one of sidelink flow identifier information of the terminal, PC5 unicast link information mapped to the sidelink flow, and PC5-LINK-AMBR for the PC5 unicast link. According to an embodiment, if it is determined that the PC5-LINK-AMBR for the PC5 unicast link mapped to the sidelink flow has been previously transferred to the base station by a core network and the value thereof has not changed, the PC5-LINK-AMBR may be omitted from the signaling in operation 853.

In operation 855, the base station may manage PC5-LINK-AMBR information. The base station may manage the PC5-LINK-AMBR information based on the QoS information received from the core network entity. Here, the PC5-LINK-AMBR information may refer to information regarding a relationship between a sidelink flow of a terminal, an SLRB, a logical channel, a PC5 unicast link, and AMBR of the PC5 unicast link. The base station may update information regarding the sidelink flow of the terminal, the PC5 unicast link (e.g., a PC5 unicast link to which the sidelink flow is mapped), and the PC5-LINK-AMBR mapped to the PC5 unicast link (or sidelink flow).

In operation 857, the terminal may transmit a signal for requesting sidelink radio bearer (SLRB) configuration information (hereinafter, SLRB configuration request signal). The terminal may transmit the SLRB configuration request signal in order to configure SLRB information enabling transmission and reception of packets corresponding to the sidelink flow. When the terminal is in an RRC connected state with the base station, the terminal may transmit the SLRB configuration request signal to the base station. The SLRB configuration request signal may include at least one of a destination identifier, a source identifier, a sidelink flow identifier, and a QoS profile of a sidelink flow (the profile may correspond to 5QI, PQI, or QoS requirements). The SLRB configuration request signal may include information regarding one or more sidelink flows.

In operation 859, the base station may transmit SLRB configuration information to the terminal. The base station may transmit SLRB configuration information to the terminal in response to the request performed in operation 857. The SLRB configuration information may include at least one of an SLRB identifier mapped to the sidelink flow, radio parameter information regarding the SLRB (e.g., at least one of SDAP configuration, PDCP configuration, RLC configuration, MAC configuration, and PHY configuration), a logical channel identifier, and a logical channel identifier group.

In operation 861, the terminal may transmit a signal for requesting a resource for the sidelink (hereinafter, a sidelink resource request signal) to the base station. The terminal may request the base station to allocate resources for transmission of a packet belonging to the sidelink flow. The sidelink resource request signal may include at least one piece of information among a destination identifier, a source identifier, a logical channel identifier, and buffer status information.

In operation 863, the base station may transmit resource allocation information for sidelink to the terminal. When receiving the sidelink resource request signal from the terminal, the base station may determine that the request is a resource request for a PC5 unicast link, and may determine a corresponding PC5 sidelink unicast link identifier, based on at least one information among a destination identifier, a source identifier, and a logical channel identifier, and the information (e.g., PC5-LINK-AMBR information) managed in operation 855. The base station may determine a sidelink resource to be allocated to the terminal based on the PC5-LINK-AMBR corresponding to the PC5 unicast link. When it is determined to perform sidelink resource allocation, the base station may transmit allocation information regarding the sidelink resource, i.e., sidelink allocation information, to the terminal.

FIG. 8C shows that operations 857 and 859 are performed after operations 851 to 855, but the disclosure is not limited thereto. Operations 851 to 855 are performed in parallel (e.g., concurrently) with a time point at which operations 857 to 859 are performed, or the time point at which operations 857 to 859 are performed may precede the time point at which operations 851 to 855 are performed. In other words, procedures for managing PC5-LINK-AMBR through signaling between the terminal and the core network entity may be performed not only before the SLRB configuration procedure but also after the SLRB configuration procedure.

In FIG. 8D, a scheme for obtaining PC5-LINK-AMBR information based on SLRB update is described. Referring to FIG. 8D, in operation 871, the terminal may determine to delete a sidelink flow. For example, the terminal may determine that at least one sidelink flow, which is preconfigured based on the information of V2X application, is no longer needed. The terminal may determine to delete the at least one sidelink flow.

In operation 873, the terminal may transmit a message for SLRB update (hereinafter, an SLRB update message). The terminal may determine the identifier of the sidelink flow to be deleted and the identifier of the PC5 unicast link mapped to the sidelink flow. The terminal may transmit the SLRB update message including information regarding the identifier of the sidelink flow and information regarding the identifier of the unicast link to the base station. The SLRB update message may include at least one of a sidelink flow identifier determined to be deleted, a sidelink unicast link identifier, a destination identifier, and a source identifier. According to an embodiment, when the sidelink flow identifier is mapped to one sidelink unicast link identifier, transmission of the sidelink unicast link identifier may be omitted. The SLRB update message may include a sidelink flow identifier determined to be deleted, and PC5-LINK-AMBR information mapped to a sidelink unicast link identifier.

In operation 875, the base station may transmit an SLRB update confirmation message. The base station may transmit the SLRB update confirmation message to the terminal as a response to the SLRB update message. The SLRB update confirmation message may include at least one of a sidelink flow identifier, a sidelink unicast link identifier, a destination identifier, and a source identifier, which are included in the SLRB update signaling of operation 873.

In operation 877, the base station may manage PC5-LINK-AMBR information. The base station may manage PC5-LINK-AMBR information based on the SLRB update message received from the terminal. The base station may update information regarding the sidelink flow, the PC5 unicast link (e.g., the PC5 unicast link to which the sidelink flow is mapped), and the PC5-LINK-AMBR mapped to the PC5 unicast link (or sidelink flow).

In FIG. 8D, an embodiment of managing PC5-LINK-AMBR after deletion of a sidelink flow has been described, but various embodiments of the disclosure are not limited thereto. According to an embodiment, operations 873 to 877 of the procedures of FIG. 8D may be used even in a case of updating the PC5-LINK-AMBR value for the sidelink unicast link regardless of the sidelink flow deletion. Here, the SLRB update signaling of operation 873 may include at least one of a sidelink flow identifier, a sidelink unicast link identifier, a PC5-LINK-AMBR, a destination identifier, and a source identifier.

In FIG. 8E, a scheme for acquiring PC5-LINK-AMBR information based on sidelink flow update is described. When a terminal performs service registration, a core network entity may manage a QoS profile of the terminal, a subscription profile, and the like. Here, the core network entity is the entity for QoS management of the terminal, and may be a network entity in charge of a policy and control function (PCF) or a network entity that is connected to a network entity in charge of the PCF to perform QoS management (e.g., a network entity in charge of a session management function (SMF)).

Referring to FIG. 8E, in operation 881, the terminal may determine to delete the sidelink flow. The terminal may determine that at least one sidelink flow, which is preconfigured based on the information of V2X application, is no longer needed. The terminal may determine to delete the at least one sidelink flow.

In operation 883, the terminal may transmit a message for updating a sidelink flow (hereinafter, a sidelink flow update message). The terminal may determine the identifier of the sidelink flow to be deleted and the identifier of a PC5 unicast link mapped to the sidelink flow. The terminal may determine the identifier of the sidelink flow to be deleted and the identifier of the PC5 unicast link mapped to the sidelink flow. The terminal may transmit an SLRB update message including information regarding the identifier of the sidelink flow and information regarding the identifier of the unicast link to the base station. The SLRB update message may include at least one of a sidelink flow identifier determined to be deleted, a sidelink unicast link identifier, a destination identifier, and a source identifier. According to an embodiment, when the sidelink flow identifier is mapped to one sidelink unicast link identifier, transmission of the sidelink unicast link identifier may be omitted. The SLRB update message may include a sidelink flow identifier determined to be deleted, and PC5-LINK-AMBR information mapped to a sidelink unicast link identifier.

In operation 885, the core network entity may update QoS information. The core network entity may update QoS information regarding the sidelink of the terminal based on the sidelink flow update message received in operation 883. The core network entity may transmit QoS information update signaling to the base station. The QoS information update signaling may include at least one of a sidelink flow identifier, a sidelink unicast link identifier, a destination identifier, and a source identifier, which are included in the sidelink flow update message of operation 883.

In operation 887, the base station may manage PC5-LINK-AMBR information. The base station may manage PC5-LINK-AMBR information based on the QoS information received from the core network entity. Here, the PC5-LINK-AMBR information may refer to information regarding a relationship between a sidelink flow of a terminal, an SLRB, a logical channel, a PC5 unicast link, and AMBR of the PC5 unicast link. The base station may update information regarding the sidelink flow, the PC5 unicast link (e.g., the PC5 unicast link to which the sidelink flow is mapped), and the PC5-LINK-AMBR mapped to the PC5 unicast link (or sidelink flow).

In FIG. 8E, an embodiment of managing PC5-LINK-AMBR after deletion of a sidelink flow has been described, but various embodiments of the disclosure are not limited thereto. According to an embodiment, operations 883 to 887 of the procedures of FIG. 8E may be used even in a case of updating the PC5-LINK-AMBR value for the sidelink unicast link regardless of the sidelink flow deletion. Here, the signaling of operations 883 and 885 may include at least one of a sidelink flow identifier, a sidelink unicast link identifier, and a PC5-LINK-AMBR.

Figure 9:
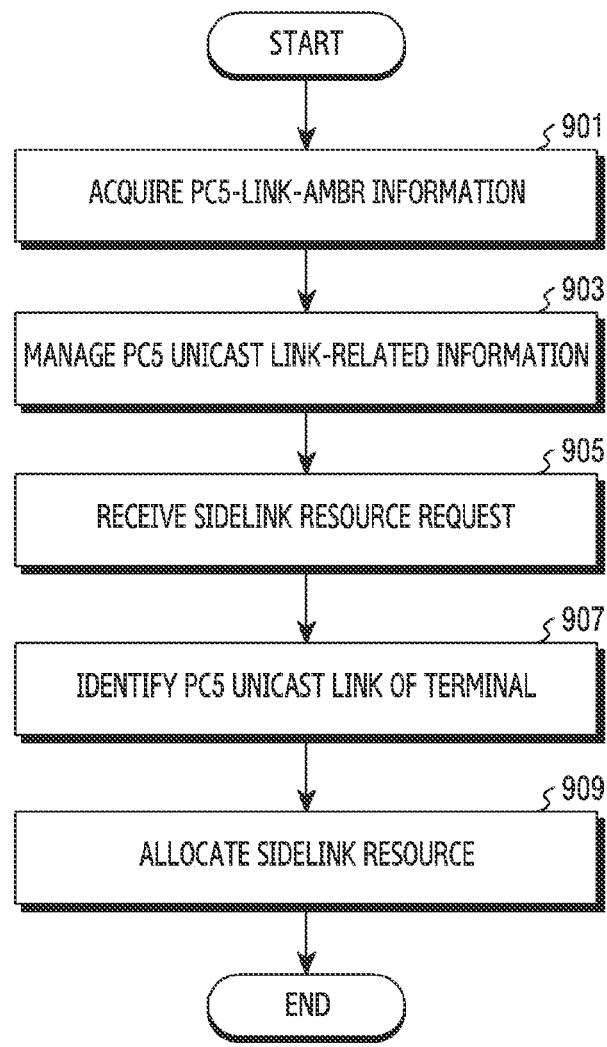
FIG. 9 illustrates a base station operation for unicast-based sidelink radio resource allocation according to various embodiments of the disclosure.

FIG. 9 illustrates a base station operation for unicast-based sidelink radio resource allocation according to various embodiments of the disclosure. The base station illustrates the base station 110 of FIG. 1.

Referring to FIG. 9, in operation 901, a base station may obtain PC5-LINK-AMBR information. The base station may obtain PC5-LINK-AMBR information regarding a PC5 unicast flow of a terminal. According to an embodiment, the PC5-LINK-AMBR information may be obtained from a signal transmitted from the terminal. For example, the signal may be an SLRB configuration request signal, a sidelink resource request signal, or an SLRB update message. In addition, according to an embodiment, the PC5-LINK-AMBR information may be obtained from a message transmitted from a core network entity. For example, the message may be a message for updating a QoS profile for a sidelink of the terminal.

A signal transmitted to a terminal or core network from an entity in order to obtain the PC5-LINK-AMBR information may include at least one of a sidelink flow identifier of the terminal, a PC5 unicast link identifier to which the sidelink flow identifier is mapped, and PC5-LINK-AMBR information corresponding to the PC5 unicast link. For example, terminal A may configure PC5-LINK-AMBR 1 (AMBR for sidelink unicast link 1) and PC5-LINK-AMBR 2 (AMBR for sidelink unicast link 2). Terminal A may transfer information regarding at least one of a sidelink flow identifier and a sidelink unicast link identifier mapped to PC5-LINK-AMBR 1 and PC5-LINK-AMBR 2, respectively, to the base station or core network entity by using the procedure of FIGS. 8A to 8C.

In operation 903, the base station may manage sidelink-related information regarding the terminal. According to various embodiments of the disclosure, sidelink-related information may include at least one piece of information among a destination identifier, a source identifier, a sidelink flow identifier, a PC5 unicast link identifier, a PC5-LINK-AMBR, an SLRB identifier, a logical channel identifier, and a logical channel group identifier of the terminal. In addition, the base station may manage the destination identifier, source identifier, sidelink flow identifier, SLRB identifier, logical channel identifier, logical channel group identifier, and PC5-LINK-AMBR information, which are mapped to the PC5 unicast link identifier.

In operation 905, the base station may receive a sidelink resource request. The base station may receive a request for a sidelink radio resource from the terminal. The request for the sidelink radio resource of the terminal may correspond to a case of receiving SL-BSR. The SL-BSR transmitted by the terminal may include at least one of a destination address, a logical channel identifier, a logical channel group identifier, and buffer status information.

In operation 907, the base station may identify the PC5 unicast link of the terminal. The base station may determine sidelink unicast link information of the terminal, mapped to information included in the SL-BSR among the sidelink-related information managed in operation 903, based on at least one piece of information among a destination address, a logical channel identifier, and a logical channel group identifier, which are included in the SL-BSR.

The base station may determine whether the PC5 unicast link corresponding to the resource request satisfies the limitation according to PC5-LINK-AMBR. That is, the base station may determine whether to perform the sidelink resource allocation requested by the terminal based on the buffer status information included in the SL-BSR of the terminal and the PC5-LINK-AMBR of the PC5 unicast link. According to an embodiment, if it is determined that the transmission rate of the PC5 unicast link does not exceed PC5-LINK-AMBR when the base station performs allocation of resources, which are allocated based on the buffer status information of the terminal, the base station may determine to allocate resources to the PC5 unicast link requested by the terminal. The base station may allocate resources to a logical channel corresponding to the PC5 unicast link. On the other hand, if it is determined that the transmission rate of the PC5 unicast link exceeds PC5-LINK-AMBR, the base station may determine to delay resource allocation for a logical channel corresponding to the PC5 unicast link requested by the terminal or not to perform resource allocation therefor. Hereinafter, operations of the base station will be described under an assumption that resource allocation is performed.

In operation 909, the base station may allocate sidelink resources. The base station may perform resource allocation to the logical channel requested by the terminal. In addition, as described above, the base station may not perform resource allocation based on PC5-LINK-AMBR. In this case, operation 909 of FIG. 9 may be omitted.

The embodiments of FIGS. 8A to 9 have been described under an assumption that, if the base station and the terminal know a sidelink flow identifier or information corresponding to the sidelink flow identifier (e.g., the SLRB identifier or logical channel identifier in the above embodiments), the PC5 unicast link identifier mapped thereto can be distinguished. For example, assuming that PC5 unicast link identifier 1 is mapped to sidelink flow identifier 1 and PC5 unicast link identifier 1 is mapped to sidelink flow identifier 2. After the base station receives the mapping information between the sidelink flow identifier and the PC5 unicast link identifier, if the sidelink resource allocation request signal transmitted by the terminal includes the sidelink flow identifier 1, a logical channel identifier corresponding to the sidelink flow identifier 1, or an SLRB identifier corresponding to the sidelink flow identifier 1, the base station may acquire PC5-LINK-AMBR corresponding to the PC5 flow identifier 1. The base station may process a sidelink resource allocation request based on PC5-LINK-AMBR corresponding to PC5 unicast link identifier 1. Alternatively, if the PC5 unicast link identifier 1 is included in the sidelink resource allocation request signal transmitted by the terminal, the base station may acquire the PC5-LINK-AMBR corresponding to the PC5 flow identifier 1. The base station may process a sidelink resource allocation request based on the PC5-LINK-AMBR corresponding to the PC5 flow identifier 1.

As another embodiment, a case in which the base station cannot distinguish the PC5 unicast link identifier by using the sidelink flow identifier information only may be considered. For example, assuming that PC5 unicast link identifier 1 is mapped to sidelink flow identifier 1 and PC5 unicast link identifier 2 is mapped to sidelink flow identifier 1. After the base station receives the mapping information, if the sidelink resource allocation request signal transmitted by the terminal includes the sidelink flow identifier 1, the SLRB identifier corresponding to the sidelink flow identifier 1, the logical channel identifier corresponding to the sidelink flow identifier 1, the base station may not know whether the request for sidelink resource allocation should be processed based on the PC5-LINK-AMBR corresponding to the PC5 unicast link identifier 1 or based on the PC5-LINK-AMBR corresponding to the PC5 unicast link identifier 2. In this case, according to an embodiment, the sidelink resource allocation request signal may include a sidelink flow identifier, information corresponding to the sidelink flow identifier (the information may correspond to a logical channel identifier or an SLRB identifier), and a PC5 unicast link identifier mapped to the corresponding sidelink flow (or logical channel, SLRB). According to another embodiment, separate identifier information enabling distinguishing between a sidelink flow identifier and a PC5 unicast link identifier mapped thereto may be defined. The separate identifier information may be included in the sidelink resource allocation request signal transmitted by the terminal to the base station.

2. Scheme for SLRB Configuration of Sidelink Flow for Each Packet

In a case of data transmission/reception through a Uu interface between a terminal and a base station, the base station may be aware of information about whether a packet to be transmitted by the terminal or to be received by the terminal is an IP packet or a non-IP packet through information exchange with a core network. In a case of data transmission/reception through a sidelink interface of the terminal, the base station may be aware of information about whether a packet to be transmitted or received by the terminal is an IP packet or a non-IP packet through information exchange with the terminal. For example, if the terminal determines that a sidelink flow for transmission of an IP packet and a sidelink flow for transmission of a non-IP packet should be separately configured, and a sidelink radio bearer (SLRB) for each flow should be separately configured, the terminal may request a separate SLRB configuration for a sidelink flow corresponding to an IP packet and a sidelink flow corresponding to a non-IP packet, respectively, from the base station. If the base station receives a separate SLRB configuration request for a sidelink flow corresponding to an IP packet and a sidelink flow corresponding to a non-IP packet from the terminal, the base station may configure a separate SLRB with regard to a sidelink flow corresponding to an IP packet and a sidelink flow corresponding to a non-IP packet, according to the request of the terminal.

As another embodiment, when transmitting and receiving PC5-S signaling between the terminal and the terminal, if the terminal determines that a sidelink flow for transmission or reception of PC5-S signaling should be separately configured, and a separate SLRB should be configured for the flow, the terminal may report to the base station that a separate SLRB configuration is required for a sidelink flow for PC5-S signaling. The base station may configure a separate SLRB for the flow for PC5-S signaling according to the request of the terminal.

As another embodiment, when transmitting and receiving PC5-RRC signaling between a terminal and a terminal, the terminal may determine that a sidelink flow for transmission or reception of PC5-RRC signaling should be separately configured and a separate SLRB should be configured for the flow. The terminal may report to the base station that a separate SLRB configuration is required for a sidelink flow for PC5-RRC signaling. The base station may configure a separate SLRB for the flow for PC5-RRC signaling according to the request of the terminal.

Hereinafter, a scheme for configuring an SLRB for each sidelink packet type will be described with reference to FIG. 10. Here, the sidelink packet type may include at least one of an IP packet, a non-IP packet, PC5-S signaling, and PC5-RRC signaling. For the sidelink communication of FIG. 10, at least one of unicast, groupcast, and broadcast may be used.

Figure 10A:
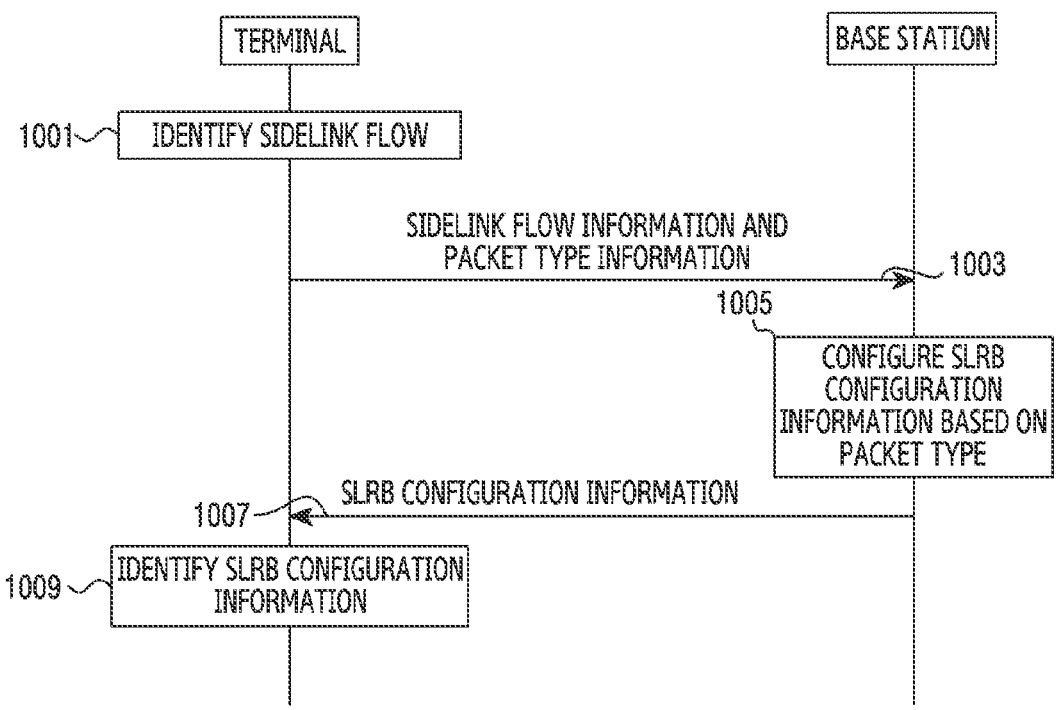
FIGS. 10A to 10C illustrate a signal flow between a terminal and a base station for sidelink radio bearer (SLRB) configuration for each packet type according to various embodiments of the disclosure.
Figure 10B:
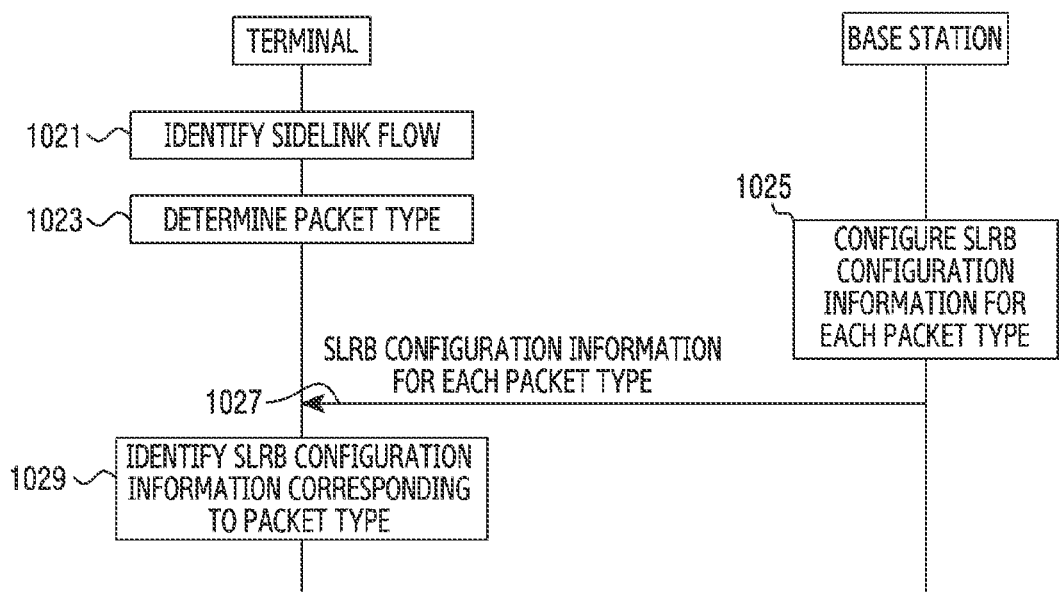
Figure 10C:
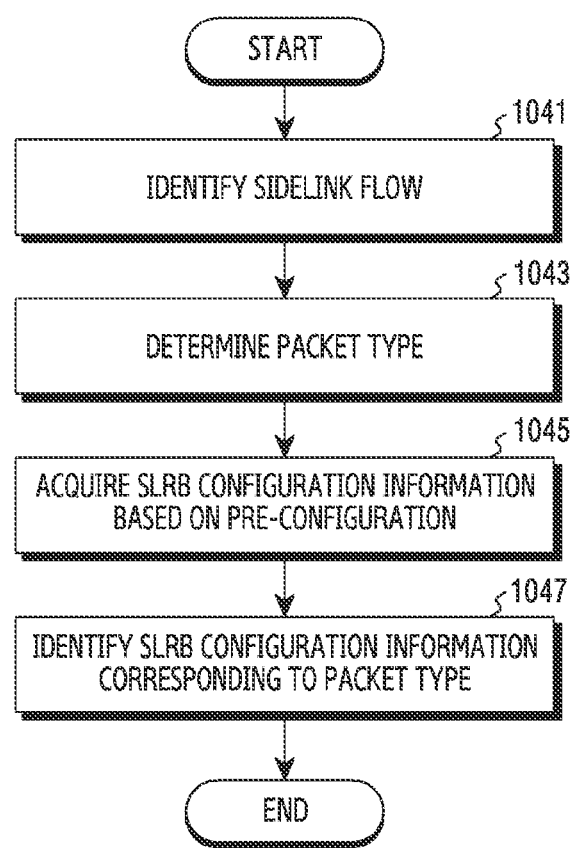

FIGS. 10A to 10C illustrate a signal flow between a terminal and a base station for sidelink radio bearer (SLRB) configuration for each packet type according to various embodiments of the disclosure.

In FIG. 10A, an embodiment in which a terminal in an RRC_CONNECTED state configures an SLRB for each packet type is described. Referring to FIG. 10A, in operation 1001, the terminal may identify a sidelink flow. The terminal may determine that a sidelink flow is generated. The terminal may identify the generated sidelink flow. For example, the terminal may identify a newly generated sidelink flow, that is, a new flow. In addition, for example, as the state of the terminal is changed to be RRC_CONNECTED, the terminal may identify a sidelink flow requiring reconfiguration.

In operation 1003, the terminal may transmit information regarding a sidelink flow and information regarding a packet type to the base station. The terminal may determine a packet type of the identified sidelink flow. The packet type may include at least one of an IP packet, a non-IP packet, PC5-S signaling, and PC5-RRC signaling. The terminal may obtain information regarding the packet type. According to various embodiments, the terminal may transmit the SLRB configuration request for the sidelink flow to the base station. The SLRB configuration request may include information regarding the sidelink flow and information regarding a packet type. For example, the SLRB configuration request may include at least one of a destination identifier, a source identifier, a sidelink flow identifier, and a packet type identifier.

The packet type identifier is an indicator indicating a packet type and may be included in the SLRB configuration request when a separate radio bearer configuration for the packet type is requested. The packet type identifier may be included in the SLRB configuration request even when a radio bearer configuration, which has been preconfigured for the same packet type as the packet type, is requested. For example, when SLRB 1 is configured and being used for sidelink flow 1 corresponding to the IP packet type and sidelink flow 2 corresponding to the IP packet type is generated in operation 1001, the terminal may report a packet type identifier for the purpose of requesting the base station to configure SLRB 1, which has already been configured for the same IP packet type, with regard to the sidelink flow 2, or to configure a new SLRB corresponding to the IP Packet type with regard to the sidelink flow 2. Meanwhile, signaling used in operation 1003 may include a SidelinkUEInformation message, a UEAssistanceInformation message, or a newly defined RRC message.

In operation 1005, the base station may configure SLRB configuration information based on the packet type. The base station may identify a packet type for a sidelink flow for which the terminal requests SLRB configuration. The base station may identify the packet type for the sidelink flow based on the signaling of operation 1003. The base station may configure SLRB configuration information regarding the packet type.

Meanwhile, according to an embodiment, unlike as shown in FIG. 10A, if the signaling of operation 1003 does not include a packet type for a sidelink flow for which the terminal requests SLRB configuration, the base station may configure the SLRB for the sidelink flow regardless of the packet type. On the other hand, if a packet type for a sidelink flow for which the terminal requests SLRB configuration is included in the signaling of operation 1003, the base station may configure an SLRB for the sidelink flow based on the packet type. The base station may configure the SLRB, which is configured for the same packet type as the packet type, in the sidelink flow. For example, when SLRB 1 is configured and being used for sidelink flow 1 corresponding to the IP packet type and sidelink flow 2 corresponding to the IP packet type is generated in operation 1001, if the base station receives the sidelink flow 2 and information indicating the IP packet type, the base station may determine to configure SLRB 1 with regard to the sidelink flow 2 or to configure new SLRB 2 corresponding to the IP packet type with regard to the side link flow 2.

In operation 1007, the base station may transmit SLRB configuration information to the terminal. The base station may transfer SLRB configuration information regarding the sidelink flow to the terminal. The SLRB configuration information of operation 1007 may include at least one of an SLRB ID and an SLRB configuration parameter.

In operation 1009, the terminal may identify SLRB configuration information. Here, the SLRB configuration information may be SLRB configuration information regarding the sidelink flow of operation 1001. In addition, the SLRB configuration information may be SLRB configuration information regarding a packet type indicated through the signaling in operation 1003.

In FIG. 10B, an embodiment in which a terminal in an RRC_IDLE or RRC_INACTIVE state configures an SLRB for each packet type is described.

Referring to FIG. 10B, in operation 1021, the terminal may identify a sidelink flow. The terminal may determine that a sidelink flow is generated. The terminal may identify the generated sidelink flow. For example, the terminal may identify a newly generated sidelink flow, that is, the new flow. In addition, for example, the terminal may identify a sidelink flow requiring reconfiguration as the state of the terminal is changed to RRC_IDLE or RRC_INACTIVE.

In operation 1023, the terminal may determine a packet type for the sidelink flow. The terminal may obtain information regarding the packet type. The packet type may include at least one of an IP packet, a non-IP packet, PC5-S signaling, and PC5-RRC signaling. Unlike FIG. 10A, the terminal in the RRC_IDLE or RRC_INACTIVE state may not transmit information regarding the packet type to the base station.

In operation 1025, the base station may configure SLRB configuration information for each packet type. The base station may configure SLRB configuration information corresponding to each packet type. For example, assuming that the packet type includes at least one of IP, non-IP, PC5-S, and PC5-RRC, the base station may independently configure SLRB configuration information corresponding to each of IP, non-IP, PC5-S, and PC5-RRC.

In operation 1027, the base station may transmit the SLRB configuration information for each packet type to the terminal. The SLRB configuration information may include at least one of a destination identifier, a QoS profile identifier, an SLRB ID, an SLRB configuration parameter, and a packet type identifier. The SLRB configuration information may be configured for each packet type identifier and transmitted. Meanwhile, when the base station does not support separate SLRB configuration for each packet type, the packet type identifier may be omitted from the SLRB configuration information. The signaling of operation 1027 may be transmitted to enable the terminal in the RRC_IDLE or RRC_INACTIVE state to receive the same. For example, the signaling of operation 1027 may include a V2X system information block (SIB).

In operation 1029, the terminal may identify SLRB configuration information corresponding to the packet type. If it is determined that the SLRB configuration information received in operation 1027 includes information for each packet type, the terminal may identify the corresponding SLRB configuration information, based on the packet type of the sidelink flow in operation 1023. In other words, the terminal may identify SLRB configuration information corresponding to the packet type of operation 1023 from among the received SLRB configuration information for each packet. For example, when the packet type determined in operation 1023 is PC5-S, and when SLRB information regarding non-IP, SLRB information regarding PC5-S, and SLRB information regarding PC5-RRC are received in operation 1207, the terminal may identify SLRB information regarding PC5-S.

On the other hand, unlike shown in FIG. 10B, when it is determined that the SLRB configuration information does not include information for each packet type, the terminal may determine the corresponding SLRB configuration information, based on at least one of the QoS profile identifier and the destination identifier of the sidelink flow, regardless of the packet type of the sidelink flow determined in operation 1023.

In FIG. 10B, operations 1025 to 1027 are illustrated as being performed after operations 1021 to 1023, but the disclosure is not limited thereto. Operations 1025 to 1027 may be performed before or in parallel with operations 1021 to 1023. That is, the operation performed by the terminal and the operation performed by the base station may be separately performed.

In FIG. 10C, an embodiment in which a terminal in an OUT-OF-COVERAGE state configures an SLRB for each packet type is described.

In operation 1041, the terminal may identify a sidelink flow. The terminal may determine that a sidelink flow is generated. The terminal may identify the generated sidelink flow. For example, the terminal may identify a newly generated sidelink flow, that is, a new flow. In addition, for example, as the state of the terminal is changed to be OUT-OF-COVERAGE, the terminal may identify a sidelink flow requiring reconfiguration.

In operation 1043, the terminal may determine a packet type for the sidelink flow in operation 1043. The terminal may obtain information regarding the packet type. The packet type may include at least one of an IP packet, a non-IP packet, PC5-S signaling, and PC5-RRC signaling. Unlike FIG. 10A, the terminal in the OUT-OF-COVERAGE may not transmit information regarding the packet type to the base station.

In operation 1045, the terminal may acquire SLRB configuration information based on pre-configuration. Separately from the procedures of FIG. 10C, the terminal may receive a pre-configuration for SLRB before being changed to OUT-OF-COVERAGE. The terminal may obtain pre-configured SLRB configuration information. The preconfigured SLRB configuration information may include at least one of a destination identifier, a QoS profile identifier, an SLRB ID, an SLRB configuration parameter, and a packet type identifier. The SLRB configuration information may be configured for each packet type identifier. When a system does not support separate SLRB configuration for each packet type, the packet type identifier may be omitted from the preconfigured SLRB configuration information.

In operation 1047, the terminal may identify SLRB configuration information corresponding to the packet type. When it is determined that the preconfigured SLRB configuration information includes information for each packet type, the terminal may identify the corresponding SLRB configuration information based on the packet type of the sidelink flow in operation 1043. In other words, the terminal may identify the SLRB configuration information corresponding to the packet type of operation 1023 from among the preconfigured SLRB configuration information for each packet. For example, the packet type determined in operation 1023 is PC5-RRC, and SLRB information regarding IP, SLRB information regarding non-IP, SLRB information regarding PC5-S, and SLRB information regarding PC5-RRC are preconfigured, the terminal may identify SLRB information regarding PC5-RRC.

On the other hand, unlike shown in FIG. 10C, when it is determined that the SLRB configuration information does not include information for each packet type, the terminal may determine the corresponding SLRB configuration information, based on at least one of the QoS profile identifier and the destination identifier of the sidelink flow, regardless of the packet type determined in operation 1043.

Figure 11A:
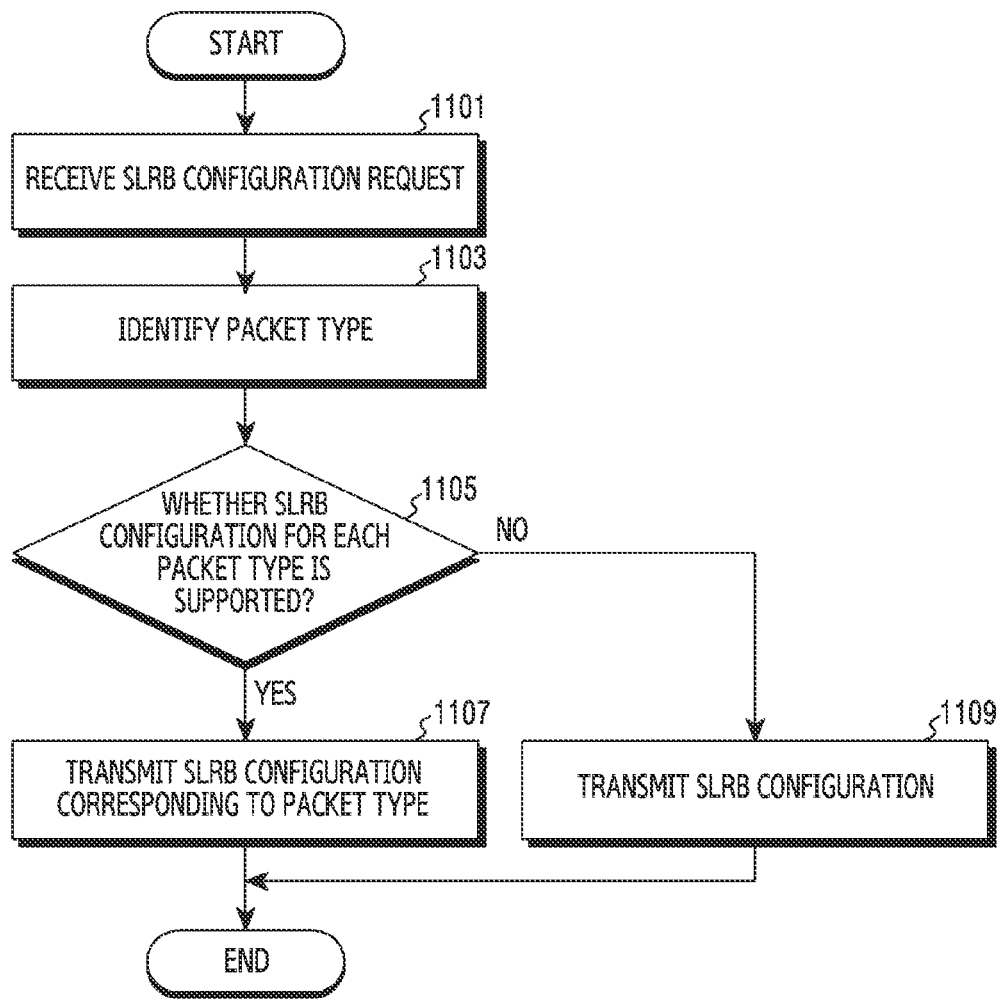
FIGS. 11A to 11B illustrate a base station operation for sidelink radio bearer setup for each packet type according to various embodiments of the disclosure.
Figure 11B:
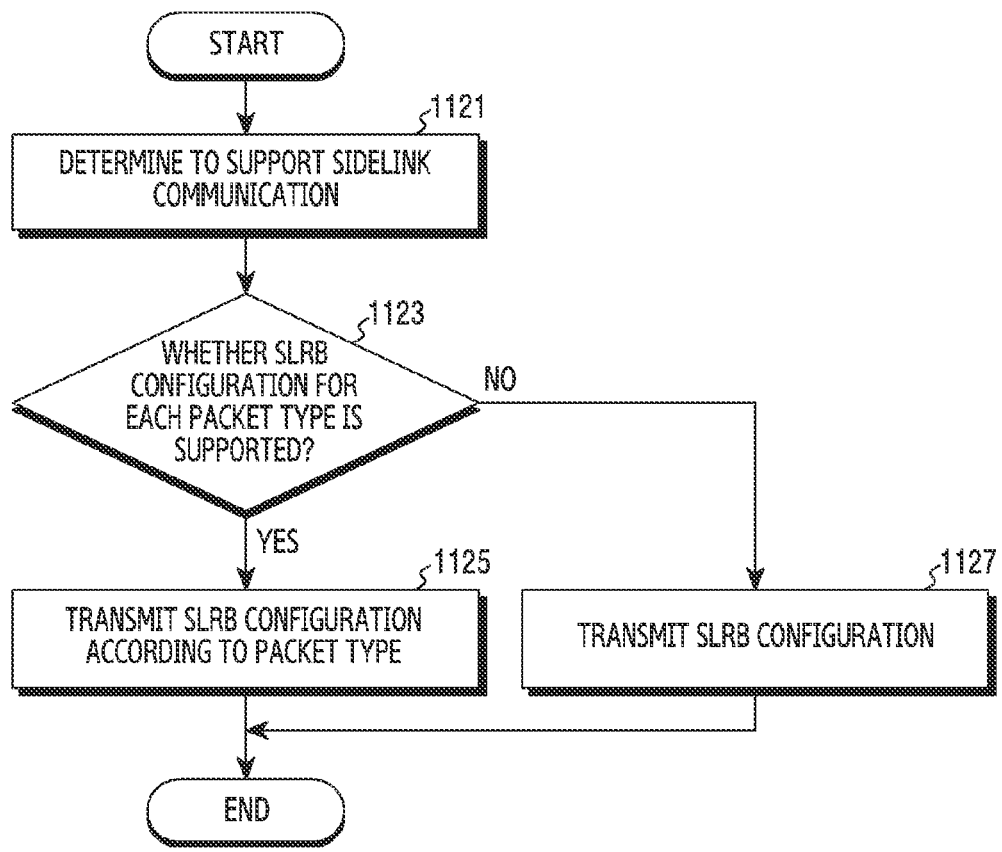

FIGS. 11A to 11B illustrate a base station operation for configuration of a sidelink radio bearer for each packet type according to various embodiments of the disclosure.

In FIG. 11A, base station operations of receiving an SLRB configuration request from a terminal in an RRC_CONNECTED state, and configuring SLRB configuration information are described. Referring to FIG. 11A, In operation 1101, the base station may receive a SLRB configuration request from terminal 1. The SLRB configuration request information may include at least one of a destination identifier, a source identifier, a QoS profile, a sidelink flow identifier, and a packet type information identifier.

In operation 1103, the base station may identify a packet type. The base station may determine that the SLRB configuration request signaling of the terminal includes a sidelink flow and packet type information regarding the same. The base station may identify a packet type for a sidelink flow requesting SLRB configuration, based on packet type information included in the SLRB configuration request.

In operation 1105, the base station may determine whether SLRB configuration for each packet type is supported. If the SLRB configuration for each packet type is supported, the base station may perform operation 1107. When the SLRB configuration for each packet type is not supported, the base station may perform operation 1109.

In operation 1107, the base station may transmit the SLRB configuration corresponding to the packet type. The base station may configure SLRB configuration information according to the packet type of the sidelink flow requested by the terminal, and transmit the SLRB configuration information to the terminal. For example, when it is determined that the packet type for which the terminal requests SLRB configuration is an IP packet, the base station may separately configure an SLRB corresponding to the IP packet from SLRBs corresponding to other packet types (at least one of non-IP, PC5-S, and PC5-RRC). For another example, when it is determined that the packet type for which the terminal requests SLRB configuration is a non-IP packet, the base station may separately configure an SLRB corresponding to the non-IP packet from SLRBs corresponding to other packet types (at least one of IP, PC5-S, and PC5-RRC). The base station may transmit the configured SLRB configuration to the terminal.

According to an embodiment, if it is determined that an SLRB corresponding to the same packet type as the packet type of the sidelink flow has already configured and the configured SLRB is allowed to be configured for the sidelink flow, the base station may provide the configured SLRB information regarding the sidelink flow to the terminal. Here, the signaling transmitted by the base station to the terminal may include at least preconfigured SLRB identifier information. According to another embodiment, if the base station determines to configure a new SLRB with regard to the sidelink flow regardless of whether an SLRB is configured according to the packet type of the sidelink flow, the base station may provide new SLRB configuration information regarding the sidelink flow to the terminal. Here, the signaling transmitted by the base station to the terminal may include at least one new SLRB identifier and an SLRB configuration parameter.

In operation 1109, the base station may configure SLRB configuration information regarding the sidelink flow requested by the terminal, and may transmit the SLRB configuration information to the terminal in operation 1109. Here, the SLRB configuration information may not be configured according to each packet type. According to an embodiment, if it is determined that the already configured SLRB is allowed to be configured for the sidelink flow, the base station may provide the terminal with the configured SLRB information regarding the sidelink flow. Here, the signaling transmitted by the base station to the terminal may include at least preconfigured SLRB identifier information. According to another embodiment, when it is determined that a new SLRB is configured for the sidelink flow, the base station may provide the terminal with new SLRB configuration information regarding the sidelink flow.

In FIG. 11B, base station operations of configuring SLRB configuration information to be used by a terminal in an RRC_IDLE state or an RRC_INACTIVE state and transmitting the configuration information are described.

Referring to FIG. 11B, in operation 1121, the base station may determine that sidelink communication is supported. For example, the sidelink communication may include NR V2X communication.

In operation 1123, the base station may determine whether SLRB configuration for each packet type is supported. If the SLRB configuration for each packet type is supported, the base station may perform operation 1125. If the SLRB configuration for each packet type is not supported, the base station may perform operation 1127.

In operation 1125, the base station may transmit the SLRB configuration for each packet type. The base station may configure SLRB configuration information for each packet type of a sidelink flow and transmit the SLRB configuration information. The signaling transmitted by the base station may include at least one of a destination address, a QoS profile, an SLRB identifier, an SLRB configuration parameter, and a sidelink packet type identifier. According to various embodiments, the base station may configure the SLRB configuration information according to each packet type identifier. For example, the base station may configure at least one piece of SLRB configuration information regarding an IP packet. As another example, the base station may configure at least one piece of SLRB configuration information regarding a non-IP packet. As another example, the base station may configure at least one SLRB configuration information regarding the PC5-S packet. As still another example, the base station may configure at least one piece of SLRB configuration information regarding the PC5-RRC packet. In operation 1125, signaling used for transmission of the SLRB configuration for each packet type may be transmitted to enable the terminal in the RRC_IDLE or RRC_INACTIVE state to receive the same. For example, the signaling may include a V2X system information block (SIB).

In operation 1127, the base station may configure SLRB configuration information, and may transmit the configured SLRB configuration information to the terminal. The signaling transmitted by the base station may include at least one of a destination address, a QoS profile, an SLRB identifier, and an SLRB configuration parameter. That is, since SLRB configuration for each packet type is not supported, the packet type identifier may be omitted. Signaling used for transmission of the SLRB configuration information by the base station may be transmitted to enable the terminal in the RRC_IDLE or RRC_INACTIVE state to receive the same. For example, the signaling may include V2X SIB.

FIG. 11A illustrates an SLRB configuration scheme of a base station for a terminal in an RRC_CONNECTED state, and FIG. 11B illustrates an SLRB configuration scheme of a base station for a terminal in an RRC_IDLE or RRC_INACTIVE state. On the other hand, a terminal, which is located outside the coverage, that is, a terminal of OUT-OF-COVERAGE, may be configured with an SLRB for each packet type through pre-configuration. The base station or core network entity may transmit the pre-configuration for the SLRB before the state of the terminal is changed to the OUT-OF-COVERAGE state.

Figure 12:
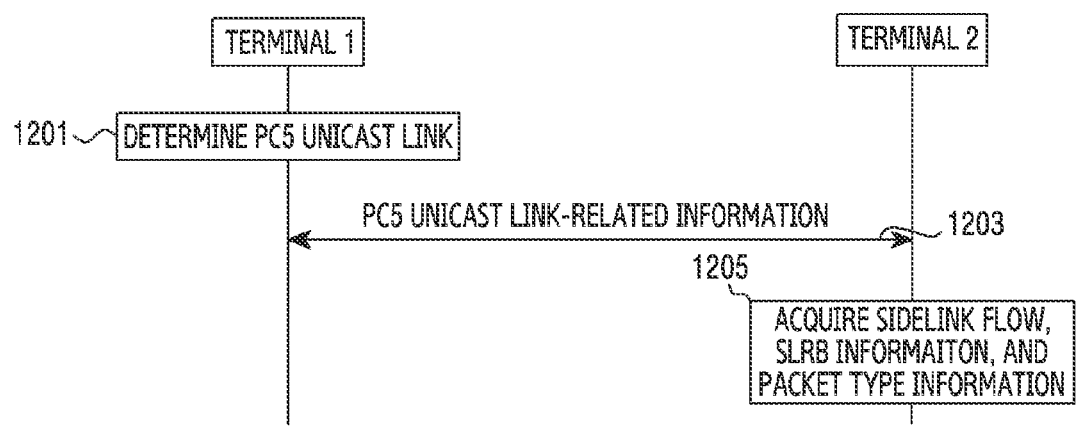
FIG. 12 illustrates a signal flow between terminals for sidelink radio bearer setup for each packet type according to various embodiments of the disclosure.

FIG. 12 illustrates a signal flow between terminals for configuration of a sidelink radio bearer for each packet type according to various embodiments of the disclosure. A situation in which a first terminal and a second terminal perform sidelink communication through a PC5 unicast link is described.

Referring to FIG. 12, in operation 1201, the first terminal may determine that unicast-based sidelink communication is performed. Specifically, the first terminal may perform sidelink communication with the second terminal. Here, the first terminal may determine that transmission or reception of the sidelink packet with the second terminal is performed based on the PC5 unicast link.

In operation 1203, the first terminal and the second terminal may exchange PC5 unicast link-related information. For example, the first terminal may transmit the PC5 unicast link-related information of the first terminal to the second terminal. In addition, as an example, the second terminal may transmit the PC5 unicast link-related information of the second terminal to the first terminal. According to various embodiments, the PC5 unicast link-related information may include at least one of information regarding a sidelink flow of sidelink communication between the first terminal and the second terminal and SLRB information regarding the sidelink flow. The first terminal may exchange, with the second terminal, at least one of sidelink flow information and SLRB information, which are to be used for sidelink unicast communication with the second terminal. If it is determined that the first terminal and the second terminal can support SLRB configuration for each packet type, the information exchanged in operation 1203 may include packet type information corresponding to the sidelink flow and SLRB.

In operation 1205, the second terminal may obtain at least one of sidelink flow information and SLRB information, which are to be used for sidelink unicast communication with the first terminal. If it is determined that the first terminal and the second terminal can support SLRB configuration for each packet type, the second terminal may determine packet type information corresponding to the sidelink flow and the SLRB. The second terminal may determine a packet type corresponding to the sidelink flow and the SLRB. The packet type information corresponding to the SLRB may be used to determine a corresponding packet type used when the first terminal and the second terminal receive a unicast packet, and to transmit the packet to the corresponding packet type processor. For example, the first terminal or the second terminal may transmit a packet, which is received through the SLRB and flow corresponding to an IP packet type, to an IP packet processor. For another example, the first terminal or the second terminal may transmit a packet, which is received through the SLRB and flow corresponding to a non-IP packet type, to a non-IP packet processor.

The SLRB configurations according to packet types (e.g., a non-IP packet and an IP packet) may be the same or different to each other. A case, in which a different SLRB configuration is required according to the packet type, may correspond to a header compression (e.g., robust header compression (ROHC)) configuration for example. With regard to an IP packet, the header compression configuration may be applied. With regard to a non-IP packet, the header compression configuration may not be applied. When the type of a packet to be transmitted or received by the terminal is a non-IP packet, the SLRB should be configured such that the header compression configuration is not applied thereto. When the type of a packet to be transmitted or received by the terminal is an IP packet, the SLRB should be configured such that the header compression configuration is applied or not.

As an embodiment of SLRB configuration according to a packet type (e.g., non-IP packet, IP packet, and the like), packet type information may be defined as one of QoS profile parameters of a service flow. Here, the QoS profile parameter may include at least one of a PQI index, a resource type (GBR, non-GBR, or delay critical GBR), a priority level, packet delay budget (PDB), a packet error rate, a maximum data burst volume, an averaging window, and a packet type (IP or non-IP). The QoS profile parameter may be configured for a base station and a terminal. In case of RRC_CONNECTED terminal, the terminal may report the QoS profile of a service flow corresponding to a packet type to the base station. Signaling for reporting the QoS profile of the service flow may include, for example, at least one of a SidelinkUEInformation message and a UEAssistanceInformation message. The base station may obtain information regarding a packet type from the QoS profile of the service flow. The base station may determine the packet type of the QoS profile and provide the SLRB configuration according to the packet type to the terminal through an RRC dedicated message. For example, if it is determined that the packet type is a non-IP packet, the SLRB configuration may include non-application of header compression. For example, if it is determined that the packet type is an IP packet, the SLRB configuration may include non-application or application of header compression. In a case of an RRC_IDLE terminal or an RRC_INACTIVE terminal, the base station may provide the SLRB configuration for the QoS profile to the terminal through a system information (SI) message. The SLRB configuration may provide a parameter list according to the packet type of the QoS profile. The terminal may acquire the SLRB configuration for the QoS profile of the service flow corresponding to the packet type through system information. In a case of OUT-OF-COVERAGE terminal, the preconfigured SLRB configuration may provide a parameter list according to the packet type of the QoS profile. The terminal may acquire the SLRB configuration for the QoS profile of the service flow corresponding to the packet type.

As another embodiment of the SLRB configuration according to a packet type (e.g., non-IP packet, IP packet, and the like), packet type information may be defined as one of QoS profile parameters of a service flow. That is, a PQI index of a QoS profile corresponding to the packet type may be configured. For example, PQI indices 1 to 5 may be configured for the non-IP packet type, and PQI indices 6 to 10 may be configured for the IP packet type. Here, the PQI index value described as an example is only one embodiment, and the example does not limit various embodiments of the disclosure. It is needless to say that the PQI index corresponding to each packet type may be selected according to system operation. Packet type information mapped to the PQI index of the QoS profile may be configured for the base station and the terminal. In a case of RRC_CONNECTED terminal, the terminal may report a PQI index of a service flow corresponding to a packet type to the base station. Signaling for reporting the PQI index of the service flow may include, for example, at least one of a SidelinkUE-Information message and a UEAssistanceInformation message. The base station may obtain information regarding packet type from the PQI index. The base station may determine the packet type of the QoS profile corresponding to the PQI index and provide the SLRB configuration according to the packet type to the terminal through an RRC dedicated message. For example, when it is determined that the packet type is a non-IP packet, the SLRB configuration may include non-application of header compression. For example, if it is determined that the packet type is an IP packet, the SLRB configuration may include non-application or application of header compression. In a case of an RRC_IDLE terminal or an RRC_INACTIVE terminal, the base station may provide the SLRB configuration for the QoS profile corresponding to the PQI index to the terminal through a system information (SI) message. The SLRB configuration may provide a parameter list according to the packet type of the PQI index of the QoS profile. The terminal may obtain the SLRB configuration for the PQI index of the service flow corresponding to the packet type through a system information (SI) message. In a case of the OUT-OF-COVERAGE terminal, the preconfigured SLRB configuration may provide a parameter list according to the packet type of the PQI index of the QoS profile. The terminal may acquire the SLRB configuration for the PQI index of the service flow corresponding to the packet type.

As another embodiment of SLRB configuration according to a packet type (e.g., non-IP packet, IP packet, and the like), packet type information may be defined as one of LAYER-2 IDs. That is, the range of the LAYER-2 ID corresponding to the packet type may be distinguished. For example, with regard to the non-IP packet type, the LAYER-2 ID range from 1 to 1000 may be configured, and with regard to the IP packet type, the LAYER-2 ID range from 1001 to 2000 may be configured. Here, the LAYER-2 ID range value described as an example is only one embodiment, and the example does not limit various embodiments of the disclosure. It is needless to say that the LAYER-2 ID corresponding to each packet type may be selected according to system operation. Packet type information mapped to the LAYER-2 ID may be configured for a base station and a terminal. In a case of RRC_CONNECTED terminal, the terminal may report the LAYER-2 ID of the service flow corresponding to the packet type to the base station. Signaling for reporting the LAYER-2 ID of the service flow may include, for example, at least one of a SidelinkUEInformation message and a UEAssistanceInformation message. The base station may obtain information regarding a packet type from the LAYER-2 ID. The base station may determine a packet type of a QoS profile corresponding to the LAYER-2 ID and provide the SLRB configuration according to the packet type to the terminal through an RRC dedicated message. For example, when it is determined that the packet type is a non-IP packet, the SLRB configuration may include non-application of header compression. For example, if it is determined that the packet type is an IP packet, the SLRB configuration may include non-application or application of header compression. In a case of an RRC_IDLE terminal or an RRC_INACTIVE terminal, the base station may provide the SLRB configuration for the QoS profile corresponding to the LAYER-2 ID to the terminal through a system information (SI) message. The SLRB configuration may provide a parameter list according to the packet type of the QoS profile. The terminal may acquire the SLRB configuration for the LAYER-2 ID of the service flow corresponding to the packet type through a system information (SI) message. In a case of the OUT-OF-COVERAGE terminal, the preconfigured SLRB configuration may provide a parameter list according to the packet type of the LAYER-2 ID. The terminal may acquire the SLRB configuration for the LAYER-2 ID of the service flow corresponding to the packet type.

As another embodiment of the SLRB configuration according to a packet type (e.g., non-IP packet, IP packet, and the like), the SLRB configuration parameter that should be configured according to a packet type may be defined to be configured by the terminal itself. In a case of an SLRB configuration parameter that does not need to be configured according to a packet type, the terminal may apply the SLRB configuration signaling of the base station or the pre-configuration-based SLRB configuration. In a case of an SLRB configuration parameter that needs to be configured according to a packet type, the terminal itself may configure the parameter without applying the SLRB configuration signaling of the base station or the pre-configuration-based SLRB configuration. That is, parameters to be configured according to a packet type may not be provided to the terminal through RRC dedicated signaling, system information signaling, or pre-configuration of the base station. When performing a procedure of configuring the SLRB configuration for the sidelink flow, the terminal may configure, with regard to an SLRB, the SLRB configuration provided by the base station or pre-configuration, and the terminal itself may configure an SLRB configuration parameter to be applied to a packet type corresponding to the SLRB. For example, the SLRB configuration provided by the base station or pre-configuration may include a PDCP configuration (e.g., PDCP-config), and the PDCP configuration (e.g., PDCP-config) may not include a header compression parameter. The terminal may configure the PDCP configuration (e.g., PDCP-config), which is provided from the base station or pre-configuration, and may configure the header compression based on a packet type. When the packet type is a non-IP packet, the terminal may not configure a header compression parameter (here, if the header compression parameter is not configured, the terminal may configure the header compression parameter to be "not used" or "NULL"). When the packet type is an IP packet, the terminal may configure the header compression parameter to be "non-used/NULL" (header compression is not applied) or a header compression profile to be applied (e.g., ROHC profile and maximum context identification (CID) (maxCID)).

As an embodiment, the SLRB configuration according to a packet type, which is configured by the terminal itself, may be transferred to a counterpart terminal through sidelink SLRB configuration signaling (e.g., a sidelink access stratum layer configuration message) in a case of sidelink unicast. Here, the SLRB configuration according to a packet type, which is configured by the terminal itself, may include a header compression parameter.

3. Scheme for Packet Filtering of a Reception Terminal

At least one piece of information among a destination identifier, a source identifier, and a cast type, or a combination thereof may be included in signaling transmitted by a transmission terminal through a sidelink control channel (e.g., physical sidelink control channel (PSCCH)) or a sidelink data channel (e.g., physical sidelink shared channel (PSSCH)). Sidelink control information (SCI) transmitted through the sidelink control channel or the sidelink data channel may include at least one information among the destination identifier, the source identifier, and the cast type. The header of an MAC PDU transmitted through the sidelink control channel may include at least one information among the destination identifier, the source identifier, and the cast type. The reception terminal may determine a destination identifier, a source identifier, and cast type information of a packet through the SCI transmitted through the sidelink control channel or the sidelink data channel. The reception terminal may determine the destination identifier, the source identifier, and the cast type information of the packet through the header of the MAC PDU transmitted through the sidelink data channel. The reception terminal may determine whether a packet corresponds to the reception terminal based on at least one piece of information among the destination identifier, the source identifier, and the cast type of the sidelink control channel or the sidelink data channel. In addition, the reception terminal may transmit a packet (i.e., a decoded MAC PDU), which is determined to correspond to the reception terminal, to a higher layer. For example, after determining whether a packet corresponds to the reception terminal, an HARQ entity may transfer a packet, which is determined to correspond to the reception terminal, to a disassembly and demultiplexing entity which is the next entity. Thereafter, the disassembly and demultiplexing entity may transfer the packet to a higher layer. In addition, the reception terminal may discard a packet, which is determined not to correspond to the reception terminal, without transferring the packet to a higher layer. In addition, according to some embodiments, if the system is configured such that the reception terminal may determine that the destination of the corresponding packet is the reception terminal itself through at least one piece of information among a destination identifier, a source identifier, and a cast type, which can be transmitted through the SCI of the sidelink control channel or the sidelink data channel, the header of the MAC PDU transmitted through the sidelink data channel may not include at least one piece of information among the destination identifier, the source identifier, and the cast type of a packet. In addition, according to some embodiments, the system may be configured such that the reception terminal determines that the destination of the corresponding packet is the reception terminal itself by combining at least one piece of information among a destination identifier, a source identifier, and a cast type, which can be transmitted through the SCI of the sidelink control channel or the sidelink data channel, and at least one piece of information among a destination identifier, a source identifier, and a cast type included in the MAC PDU header of the sidelink data channel. By providing schemes in which the reception terminal may perform an operation of determining that the destination of the corresponding packet is the reception terminal itself in a lower layer, the above various embodiments have an advantage of efficiently using a buffer and processing power of the reception terminal and reducing a delay in packet processing, compared to a scheme in which the reception terminal unnecessarily transfers a packet, the destination of which is not the reception terminal itself, to a higher layer and determines whether to perform packet drop in a higher layer.

Hereinafter, various schemes capable of determining a packet type identifier will be described with reference to FIG. 13. The packet type identifier processing scheme enables the reception terminal to quickly determine the packet type and to quickly perform packet processing. The packet type identifier may include at least one of an IP packet, a non-IP packet, and a PC5-S packet.

FIGS. 13A to 13D illustrate examples of packet filtering according to various embodiments of the disclosure.

Figure 13A:
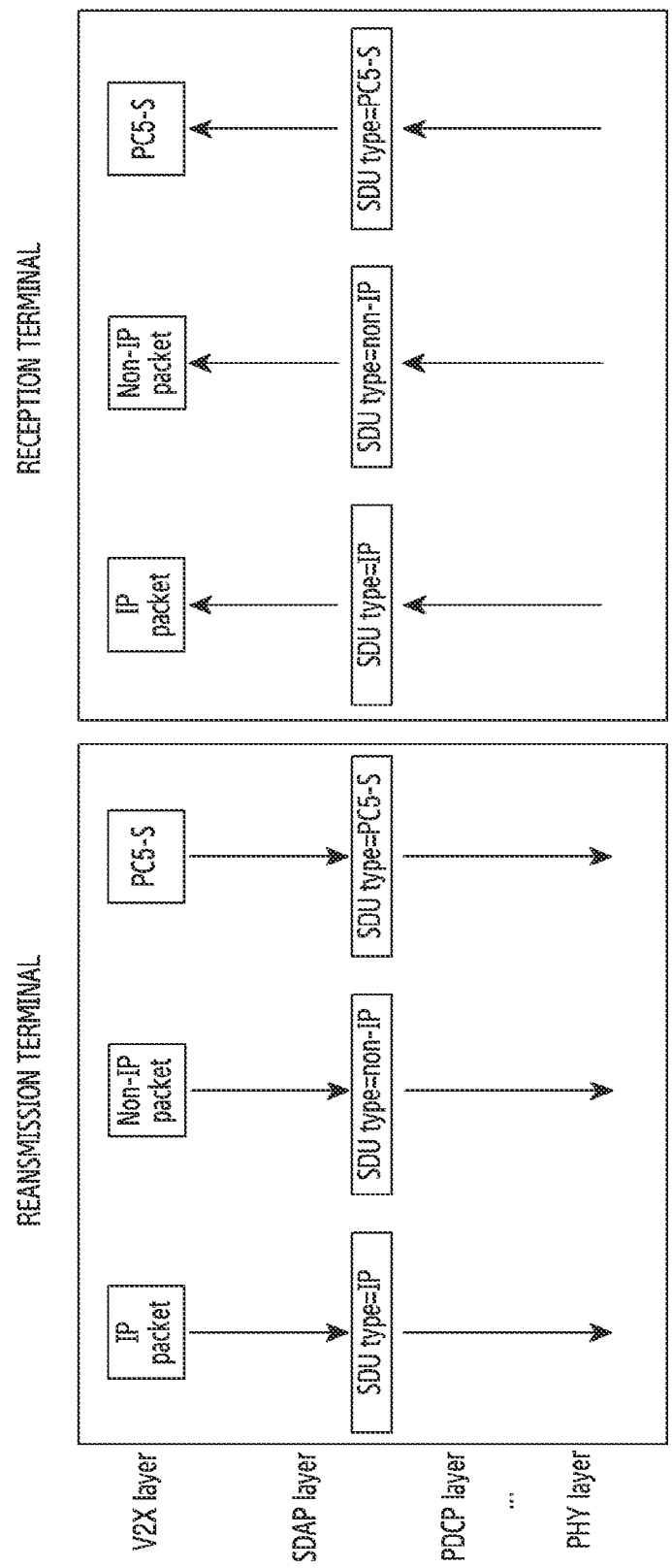
FIGS. 13A to 13D illustrate examples of packet filtering according to various embodiments of the disclosure.

In FIG. 13A, an embodiment in which packet filtering is performed in a PDCP layer is described. Referring to FIG. 13A, a V2X layer of a transmission terminal may determine a packet type identifier corresponding to a sidelink flow or a sidelink packet. The packet type identifier may include at least one of an IP packet, a non-IP packet, and PC5-S. When the packet type identifier is PC5-S, the sidelink flow may be omitted and each packet may be managed as a sidelink packet. The V2X layer may transfer a packet and information of the packet type identifier to the PDCP layer. The PDCP layer of the transmission terminal may configure the packet type identifier corresponding to the packet as a service data unit (SDU) type and transmit the packet type identifier to a lower layer (e.g., an RLC layer, a MAC layer, a PHY layer). When receiving a packet from a lower layer, the PDCP layer of the reception terminal may determine the packet type identifier configured as the SDU type. The PDCP layer may transfer the packet and the packet type identifier information to the V2X layer. The V2X layer of the reception terminal may determine the packet type based on the packet type identifier information, and may transmit the packet to a corresponding packet processor. For example, the V2X layer of the reception terminal may transfer a packet corresponding to an IP packet type to an IP packet processor, transfer a packet corresponding to a non-IP packet type to a non-IP packet processor, and transfer a packet corresponding to a PC5-S packet type to a PC5-S processor, respectively.

In a case of sidelink unicast in the example of FIG. 13A, a V2X layer of the transmission terminal may determine the packet type identifier for the sidelink flow of the PC5 unicast link. The V2X layer of the transmission terminal may transfer the packet and packet type information to the PDCP layer, and the PDCP layer may configure the packet type information identifier as the SDU type. The PDCP layer of the reception terminal may determine the packet type information configured as the SDU type of the packet received from the lower layer, and may transfer the packet and the packet type identifier to the V2X layer. A V2X layer of the reception terminal may transmit the sidelink flow and the corresponding packet of the sidelink unicast link to a corresponding packet processor based on the packet type identifier information.

In a case of sidelink groupcast in the example of FIG. 13A, the V2X layer of the transmission terminal may determine the packet type identifier for the sidelink flow. The V2X layer of the transmission terminal may transfer a packet and packet type information to the PDCP layer. The PDCP layer of the transmission terminal may configure the packet type information identifier as the SDU type. The PDCP layer of the reception terminal may determine the packet type information configured as the SDU type of the packet received from a lower layer, and may transfer the packet and the packet type identifier to the V2X layer. The V2X layer of the reception terminal may transmit a packet according to the group cast to a packet processor corresponding to the packet type based on the packet type identifier information.

In the example of FIG. 13A, a packet according to sidelink broadcast may be processed in the same or similar manner as the case of sidelink groupcast.

Figure 13B:
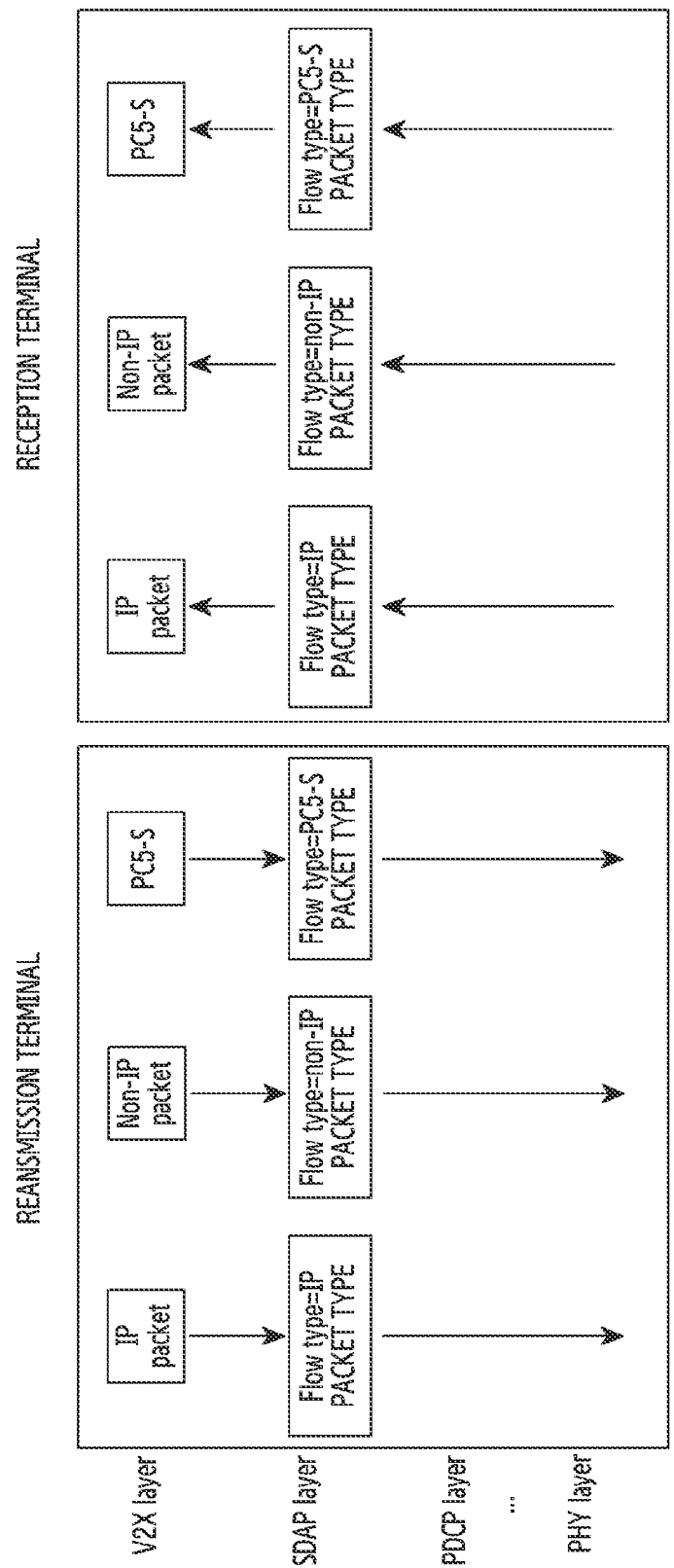

In FIG. 13B, an embodiment in which packet filtering is performed in an SDAP layer is described. Referring to FIG. 13B, terminals supporting sidelink communication may separately manage a sidelink flow identifier for each packet type so as to determine a packet type based on the sidelink flow identifier when packer reception occurs. That is, the sidelink flow identifier may be associated with a specific packet type. The packet type may include at least one of IP, non-IP, and PC5-S.

The V2X layer of the transmission terminal may determine a packet type identifier corresponding to a sidelink flow or sidelink packet. The packet type identifier may include at least one of an IP packet, a non-IP packet, and PC5-S. The V2X layer of the transmission terminal may select one sidelink flow identifier from a sidelink flow identifier pool corresponding to a packet type, based on packet type-flow identifier mapping information (e.g., information in [Table 1]), and may configure the flow identifier with regard to a sidelink flow corresponding to the packet type. The V2X layer of the transmission terminal may transfer the packet and the selected flow identifier information to the SDAP layer. The SDAP layer may configure the flow identifier in the SDAP header. The SDAP layer may transfer the packet to a lower layer (e.g., a PDCP layer, an RLC layer, a MAC layer, or a PHY layer).

When receiving a packet from a lower layer, the SDAP layer of the reception terminal may transmit flow identifier information of the SDAP header together with the packet to the V2X layer. The V2X layer may determine packet type information corresponding to the flow identifier based on the packet type-flow identifier mapping information (e.g., information in [Table 1]), and may transfer the packet to the corresponding packet processor. For example, the V2X layer of the reception terminal may transfer a packet corresponding to an IP packet type to an IP packet processor, transfer a packet corresponding to a non-IP packet type to a non-IP packet processor, and a packet corresponding to a PC5-S packet type to a PC5-S processor, respectively.

[Table 1] shows an operation example of the packet type-flow identifier mapping information described above in FIG. 13B, that is, the sidelink flow identifier pool for each packet type. For example, the number of sidelink flows may be configured according to the size of the flow ID field of the SDAP header.

TABLE 1

| Packet type | Sidelink flow identifier |
|---|---|
| IP | 1.. N |
| Non-IP | N + 1 .. M |
| PC5-S | M + 1 |
| Reserved | L.. L + X |

In a case of sidelink unicast in the example of FIG. 13B, the V2X layer of the transmission terminal may determine the packet type identifier for the sidelink flow of the PC5 unicast link. The V2X layer may select a flow identifier from the flow identifier pool corresponding to packet type information as shown in [Table 1], and may transfer the packet and flow identifier information to the SDAP layer. The SDAP layer may configure the flow identifier in the SDAP header and may transfer the packet to a lower layer. The SDAP layer of the reception terminal may determine the flow identifier information configured in the SDAP header of the packet received from the lower layer, and may transfer the packet and the flow identifier information to the V2X layer. The V2X layer of the reception terminal may determine the packet type information corresponding to the flow identifier information based on [Table 1], and may transfer the sidelink flow and the corresponding packet of the sidelink unicast link to a corresponding packet processor.

In a case of the sidelink groupcast in the example of FIG. 13B, the V2X layer of the transmission terminal may determine the packet type identifier for the sidelink flow. The V2X layer of the transmission terminal may select a flow identifier from the flow identifier pool corresponding to packet type information as shown in [Table 1], and may transfer the packet and flow identifier information to the SDAP layer. The SDAP layer of the transmission terminal may configure the flow identifier information in the SDAP header and transfer the packet to a lower layer. The SDAP layer of the reception terminal may determine the flow identifier information configured in the SDAP header of the packet received from the lower layer, and may transfer the packet and the flow identifier information to the V2X layer. The V2X layer of the reception terminal may determine packet type information corresponding to the flow identifier information based on [Table 1], and may transfer the packet of the sidelink flow to the corresponding packet processor.

In the example of FIG. 13B, the packet according to the sidelink broadcast may be processed in the same or similar manner as that of the sidelink groupcast.

Figure 13C:
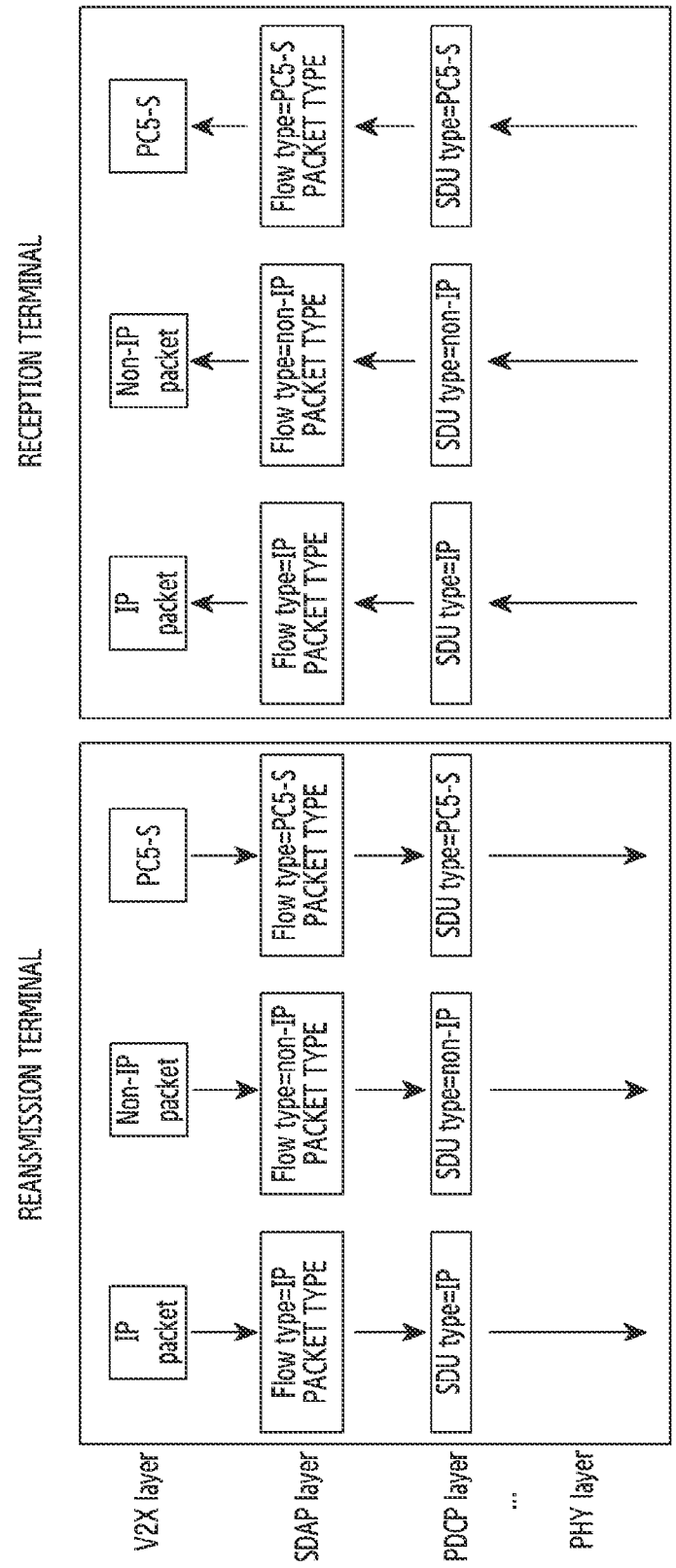

In FIG. 13C, an embodiment in which packet filtering is performed in the SDAP layer and the PDCP layer is described. Referring to FIG. 13C, the V2X layer of the transmission terminal may determine a packet type identifier corresponding to a sidelink flow or a sidelink packet. The packet type identifier may include at least one of an IP packet, a non-IP packet, and PC5-S. When the packet type identifier is PC5-S, the sidelink flow may be omitted and each packet may be managed as a sidelink packet. The V2X layer of the transmission terminal may configure the identifier for the sidelink flow. The V2X layer of the transmission terminal may transmit the packet, the packet type identifier, and the sidelink flow identifier information to an AS layer. The access stratum (AS) layer may denote, for example, at least one of an SDAP layer, a PDCP layer, and a MAC layer. The SDAP layer of the transmission terminal may configure a sidelink flow identifier in the SDAP header of the packet and transmit the packet to the PDCP layer. The PDCP layer of the transmission terminal may configure the packet type identifier corresponding to the packet as the SDU type and transmit the packet type identifier to a lower layer. When receiving a packet from a lower layer, the PDCP layer of the reception terminal may determine the packet type identifier configured as the SDU type. The PDCP layer may transfer the packet type identifier information to the V2X layer. The PDCP layer of the reception terminal may transfer the packet to the SDAP layer. The SDAP layer of the reception terminal may determine the flow identifier configured in the SDAP header of the packet, and may transfer the packet and flow identifier information to the V2X layer. The V2X layer of the reception terminal may determine the packet type and flow information based on the packet type identifier and the flow identifier information, and may transfer the packet to the corresponding packet processor. For example, the V2X layer of the reception terminal may transfer a packet corresponding to an IP packet type to an IP packet processor, transfer a packet corresponding to a non-IP packet type to a non-IP packet processor, and transfer a packet corresponding to the PC5-S packet type to a PC5-S processor, respectively.

In a case of sidelink unicast in the example of FIG. 13C, the V2X layer of the transmission terminal may determine the packet type identifier for the sidelink flow of the sidelink unicast link, and may configure the identifier of the sidelink flow. The V2X layer of the transmission terminal may transfer a packet, a packet type identifier, and flow identifier information to an AS layer. The AS layer may denote, for example, at least one of an SDAP layer, a PDCP layer, and a MAC layer. The SDAP layer of the transmission terminal may configure a flow identifier in the SDAP header and transfer the packet to the PDCP layer. The PDCP layer of the transmission terminal may configure the packet type information identifier as the SDU type and transmit the packet to a lower layer. The PDCP layer of the reception terminal may determine the packet type information configured as the SDU type of the packet received from the lower layer, and may transfer the packet type identifier to the V2X layer. The PDCP layer of the reception terminal may transfer the packet to the SDAP layer. The SDAP layer of the reception terminal may determine the flow identifier information configured in the SDAP header of the packet, and may transfer the packet and the flow identifier information to the V2X layer. The V2X layer of the reception terminal may transfer the sidelink flow and the corresponding packet of the sidelink unicast link to a corresponding packet processor based on the packet type identifier and flow identifier information.

In a case of the sidelink groupcast in the example of FIG. 13C, the V2X layer of the transmission terminal may determine the packet type identifier for the sidelink flow and configure the flow identifier. The V2X layer of the transmission terminal may transfer a packet, packet type information, and flow identifier information to the AS layer. The SDAP layer of the transmission terminal may configure a flow identifier in the SDAP header of the packet and may transfer the packet to the PDCP layer. The PDCP layer of the transmission terminal may configure the packet type information identifier as the SDU type. The PDCP layer of the reception terminal may determine the packet type information configured as the SDU type of the packet received from the lower layer, and may transfer the packet type identifier to the V2X layer. The PDCP layer of the reception terminal may transfer the packet to the SDAP layer. The SDAP layer of the reception terminal may determine the flow identifier information configured in the SDAP header of the packet, and may transfer the packet and the flow identifier information to the V2X layer. The V2X layer of the reception terminal may transfer the packet according to groupcast to a packet processor corresponding to the packet type based on the packet type identifier information.

In the example of FIG. 13C, a packet according to sidelink broadcast may be processed in the same or similar manner as the case of sidelink groupcast.

Figure 13D:
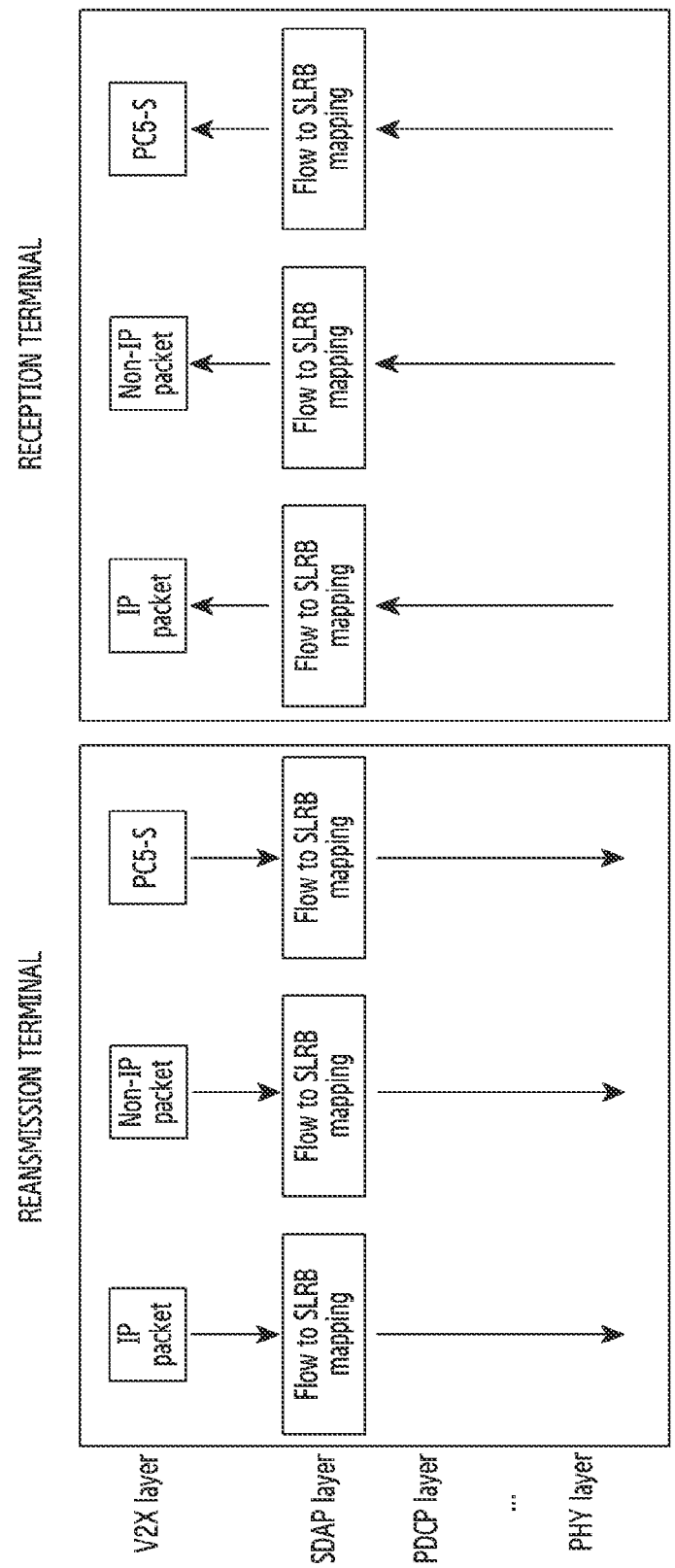

In FIG. 13D, an embodiment in which packet filtering is performed according to mapping between a sidelink flow and an SLRB is described. Referring to FIG. 13D, in a case of sidelink unicast, two terminals may exchange SLRB configuration information and packet type information regarding a sidelink flow therebetween. In addition, both terminals may perform packet transmission or reception through the configured SLRB of the sidelink flow. For example, as shown in FIG. 12, a procedure of exchanging SLRB configuration information and packet type information between two terminals performing the sidelink unicast-based packet transmission or reception may be performed.

When a packet to be transmitted through the configured unicast flow occurs, the V2X layer of the transmission terminal may transmit the packet and a flow identifier of the packet to an SDAP layer. The SDAP layer of the transmission terminal may determine an SLRB mapped to the flow identifier of the packet, and may transfer the packet to a lower layer (e.g., PDCP layer, RLC layer, MAC layer, or PHY layer). A lower layer of the transmission terminal may transfer the packet through the SLRB. The reception terminal may receive a packet for the SLRB, and the SDAP layer of the reception terminal may determine a flow identifier mapped to the SLRB for which the packet is received. The SDAP layer of the reception terminal may transfer the packet and flow identifier information to the V2X layer. The V2X layer of the reception terminal may determine packet type information based on the flow identifier information of the packet. Since packet type information corresponding to the sidelink flow and packet type information corresponding to the SLRB are exchanged between two terminals (a transmission terminal and a reception terminal), the V2X layer of the reception terminal may determine a packet type based on the flow identifier information. The V2X layer of the reception terminal may transfer the sidelink flow and the corresponding packet of the sidelink unicast link to a corresponding packet processor.

The embodiment of FIG. 13D may be difficult to be applied to sidelink groupcast or sidelink broadcast, which has limitations in exchanging sidelink flow identifiers, SLRB information, and corresponding packet type information between target terminals.

In a case of sidelink unicast according to other embodiments of the disclosure, a sidelink flow configured between two terminals and a PC5 unicast link identifier to which the sidelink flow is mapped may be mapped to packet type information. For example, unicast link identifier 1 may be mapped to at least one sidelink flow corresponding to an IP packet type, and unicast link identifier 2 may be mapped to at least one sidelink flow corresponding to a non-IP packet type. One or more sidelink unicast links corresponding to the IP packet type may be configured. One or more sidelink unicast links corresponding to the non-IP packet type may be configured. When performing an SLRB configuration procedure for unicast use between two terminals for performing sidelink unicast-based packet transmission or reception, packet type information regarding the sidelink flow or packet type information regarding the sidelink unicast link and sidelink flow may be exchanged. When a packet to be transmitted by the transmission terminal occurs, the V2X layer of the transmission terminal may map, based on the packet type, a flow for packet transmission to a unicast link of the corresponding packet type. The V2X layer of the reception terminal may determine a packet type of the packet based on the packet type information of the unicast link to which the flow for which packet reception occurs is mapped. The V2X layer of the reception terminal may transfer the packet to a corresponding packet processor. In addition to the operation of V2X layer of each of the transmission terminal and the reception terminal, the operations of the SDAP layer and the PDCP layer of each of the transmission terminal and the reception terminal may be performed as follows. The SDAP layer of the transmission terminal may map a corresponding SLRB to the flow identifier of the packet, and the SDAP layer of the reception terminal may obtain the flow identifier from the SLRB for which the packet is received. As another embodiment, the SDAP layer of the transmission terminal may configure the flow identifier in the SDAP header, and the SDAP layer of the reception terminal may obtain the flow identifier configured in the SDAP header. The PDCP layer of the transmission terminal may configure the packet type information received from a higher layer as the SDU type, and the PDCP layer of the reception terminal may transfer the packet type information configured as the SDU type to a higher layer.

Next, operations of the transmission terminal and the reception terminal according to each cast type will be described.

The V2X layer of the transmission terminal may determine a cast type of a sidelink packet or a packet corresponding to a sidelink flow. The cast type may include at least one of unicast, groupcast, and broadcast. The V2X layer may transfer at least one of a sidelink flow identifier corresponding to the packet, the packet and packet type information, a destination identifier, a source identifier, and a cast type to an AS layer. The AS layer may include, for example, at least one of an SDAP layer, a PDCP layer, and a MAC layer. The SDAP layer of the transmission terminal may map a corresponding SLRB to the flow identifier of the packet. When the SDAP header is configurable in the SDAP layer, the flow identifier is configurable in the SDAP header. The SDAP layer of the transmission terminal may transfer the packet to the PDCP layer. The PDCP layer of the transmission terminal may determine packet type information of the packet. The PDCP layer of the transmission terminal may determine a packet type of the packet and configure an SDU type based on the packet type. That is, the PDCP layer of the transmission terminal may configure the packet type identifier as the SDU type. The PDCP layer of the transmission terminal may transfer the packet to a lower layer (e.g., RLC layer, MAC layer, or PHY layer). If configuration of the destination identifier and the source identifier is allowed in the MAC header, the MAC layer among the lower layers of the PDCP layer may configure the destination identifier and the source identifier of the packet in the MAC header. If configuration of the cast type is allowed in the MAC header, the MAC layer of the transmission terminal may include cast type information in the MAC header. The cast type information may be used when it is determined that a cast type corresponding to a packet is not distinguishable based on the destination identifier and source identifier. The destination identifier and the source identifier of the MAC header may be used when it is determined that a destination corresponding to a packet is not distinguishable based on the SCI transmitted through the sidelink control channel. If the cast type information is allowed to be configured in the SCI that is transmittable through the sidelink control channel, the transmission terminal may include the cast type information in the SCI. The transmission terminal may transmit the SCI including cast type information to the reception terminal. If the destination identifier and source identifier are allowed to be configured in the SCI that is transmittable through the sidelink control channel, the transmission terminal may include the destination identifier information and source identifier information in the SCI. The transmission terminal may transmit the SCI including the destination identifier information and source identifier information to the reception terminal.

The reception terminal may receive the SCI through the sidelink control channel and determine whether cast type information is included therein. If the cast type information is included in the SCI, the reception terminal may determine the cast type of the corresponding packet. The reception terminal may determine whether the destination identifier information and source identifier information are included in the SCI. If the SCI includes the destination identifier information and source identifier information, the reception terminal may determine the destination identifier and source identifier of the corresponding packet. According to an embodiment, the reception terminal may distinguish a cast type through the destination identifier and the source identifier. Based on the destination identifier, source identifier, and cast type information of the SCI, the reception terminal may determine whether the corresponding packet is related to the reception terminal itself. If it is determined that the packet is not related to the reception terminal itself, the reception terminal may drop the packet. If it is determined that the packet is related to the reception terminal itself, the reception terminal may transmit the packet to a higher layer. If the destination identifier and the source identifier are allowed to be configured in the MAC PDU header, the MAC layer of the reception terminal may determine the destination identifier and the source identifier of the MAC header.

If the cast type is allowed to be configured in the MAC PDU header, the MAC layer of the reception terminal may determine cast type information of the MAC header. The MAC layer of the reception terminal may determine whether the corresponding packet is related to the reception terminal itself through at least one of the destination identifier, source identifier, and cast type. If it is determined that the packet is related to the reception terminal itself, the reception terminal may transmit the packet to a higher layer. If it is determined that the packet is not related to the reception terminal itself, the reception terminal may drop the packet. If the SDU type is configured, the PDCP layer of the reception terminal may determine the packet type identifier from the SDU type information. The packet type information may be transmitted to a higher layer. The SDAP layer of the reception terminal may determine flow information from the SLRB to which the packet is transferred. The SDAP layer of the reception terminal may determine, if the SDAP header is configured, the flow identifier information from the SDAP header. The flow information may be transferred to a higher layer (e.g., a V2X layer).

The V2X layer, which corresponds to a higher layer of the reception terminal, may determine a cast type which the corresponding packet has, based on the flow identifier and the packet type identifier. According to an embodiment, the V2X layer of the reception terminal may determine a PC5 unicast link based on the flow identifier and the packet type identifier, and may determine that the corresponding packet is a unicast packet. The PC5 unicast link may be mapped to at least one of a flow identifier and a packet type identifier. The V2X layer of the reception terminal may transfer the packet to the corresponding packet type processor. According to an embodiment, the V2X layer of the reception terminal may determine that the corresponding packet is a sidelink groupcast packet based on the flow identifier and the packet type identifier. The V2X layer of the reception terminal may transfer the packet to the corresponding packet type processor. In addition, according to an embodiment, the V2X layer of the reception terminal may determine that the corresponding packet is a sidelink broadcast packet based on the flow identifier and the packet type identifier. The V2X layer of the reception terminal may transfer the packet to a corresponding packet type processor.

4. Scheme for Semi-Persistent Type Sidelink Resource Allocation for Aperiodic Traffic In a case of mode 1 resource allocation, a terminal may report information regarding a sidelink flow or sidelink packet to a base station in order to receive sidelink resource allocation from the base station. The information regarding the sidelink flow or sidelink packet may include information regarding a traffic pattern for periodically occurring sidelink traffic. The sidelink traffic pattern information may include at least one piece of information among a packet size, a transmission period, and a transmission offset. Instead of a dynamic resource allocation method of receiving a sidelink resource allocation request from the terminal and allocating sidelink resources with regard to the resource allocation request based on the traffic pattern for the periodically occurring sidelink traffic, the base station may perform sidelink resource allocation to the terminal by using a semi-persistent resource allocation method even if there is no sidelink resource allocation request from the terminal. Here, the semi-persistent resource allocation method may correspond to at least one of semi persistent scheduling (SPS), configured grant type 1, and configured grant type 2.

Traffic generated from a V2X application suitable for a high-level autonomous driving service tends to require lower latency and higher reliability. When the traffic of the V2X application requiring low latency and high reliability does not occur periodically, a method, in which the terminal transmits a sidelink resource allocation request and the base station dynamically allocates resources relating thereto, may be used in order to transmit the traffic generated in the V2X application. However, the dynamic sidelink resource allocation method is highly unlikely to be suitable for traffic transmission of the V2X application requiring low latency and high reliability. Therefore, a method for allowing a terminal to use semi-persistent sidelink resources, which are allocated for the periodically occurring traffic, for the use of traffic that occurs aperiodically but requires low latency and high reliability.

A first scheme for supporting semi-persistent resource allocation for aperiodic traffic use according to various embodiments of the disclosure is as follows.

A terminal may report QoS profile information of a sidelink flow corresponding to aperiodic traffic to a base station. RRC signaling, which is used for the terminal to report a sidelink flow corresponding to aperiodic traffic and QoS profile information relating thereto, may include at least one of a Sidelink UE Information message, a UE Assistance Information message, and a new RRC dedicated message. The QoS profile of the sidelink flow may correspond to at least one of QoS requirements corresponding to aperiodic traffic requiring low latency and high reliability, 5QI, and PQI. If it is determined that aperiodic traffic requires high reliability and low latency, based on the QoS profile of the sidelink flow received from the terminal, the base station may determine to apply the semi-persistent type sidelink resource allocation to the sidelink flow. The base station may transmit semi-persistent type sidelink resource allocation information regarding the sidelink flow to the terminal. The information transmitted by the base station to the terminal may include at least one of a sidelink flow identifier, an SLRB identifier, a logical channel identifier, and semi-persistent type sidelink resource allocation information. The terminal may determine, with regard to the sidelink flow, the semi-persistent type sidelink resource allocation.

A second scheme for supporting semi-persistent resource allocation for aperiodic traffic use according to various embodiments of the disclosure is as follows.

The terminal may report sidelink traffic information, which is required for the base station to process semi-persistent resource allocation for sidelink traffic transmission use. The information reported by the terminal to the base station may include at least one of sidelink flow information, sidelink traffic pattern information that can be periodically transmitted, and sidelink traffic pattern information that can be aperiodically transmitted. For example, the information reported by the terminal to the base station may be configured as shown in [Table 2]. Upon receiving the information in [Table 2] from the terminal, the base station may determine whether a sidelink flow has a sidelink traffic pattern that can be periodically transmitted or a sidelink traffic pattern that can be transmitted aperiodically. In addition, the base station may determine whether to configure sidelink resource allocation information with regard to the sidelink flow in a semi-persistent manner based on the traffic pattern information. When the base station determines to perform sidelink resource allocation with regard to the sidelink flow in a semi-persistent manner, the base station may provide semi-persistent type sidelink resource allocation information to the terminal. The information transmitted by the base station to the terminal may include at least one of a sidelink flow identifier, an SLRB identifier, a logical channel identifier, and semi-persistent type sidelink resource allocation information. The semi-persistent type sidelink resource allocation information provided by the base station to the terminal may be separately configured for each of the periodically transmittable sidelink traffic and aperiodically transmittable sidelink traffic or configured to be shared with each other. In the latter case, that is, when resource allocation information is shared between periodic sidelink traffic and aperiodic sidelink traffic, the resource allocation information may include at least one of sidelink flow identifier information, SLRB identifier, and logical channel identifier, which are to use the same semi-persistent type sidelink resource. The terminal may determine the semi-persistent type sidelink resource allocation with regard to the sidelink flow.

TABLE 2

```
UEAssistanceInformation-IEs ::= SEQUENCE {
    cg-AssistanceInformation SEQUENCE {
        sidelinkFlowInfoList SidelinkFlowInfoList,
        trafficPatternInfoListSL TrafficPatternInfoList OPTIONAL,
        aperiodicTrafficInfoListSL AperiodicTrafficInfoList OPTIONAL
    } OPTIONAL,
}
SidelinkFlowInfoList ::= SEQUENCE (SIZE (1..maxSidelinkFlow)) OF SidelinkFlowInfo
SidelinkFlowInfo ::= SEQUENCE {
    sidelinkFlowID INTEGER (0..maxFID)
}
TrafficPatternInfoList ::= SEQUENCE (SIZE (1..maxTrafficPattern)) OF TrafficPatternInfo
TrafficPatternInfo ::= SEQUENCE {
    trafficDestinationSL-DestinationIdentity OPTIONAL,
    trafficPeriodicity ENUMERATED { period1, period2, period3, period4, period5, period6, periodX},
    timingOffset INTEGER (0..10239),
    priorityInfoSL SL-Priority OPTIONAL,
    logicalChannelIdentity INTEGER (0..Y) OPTIONAL,
    messageSize BIT STRING (SIZE (6))
}
AperiodicTrafficInfoList ::= SEQUENCE (SIZE (1..maxTrafficPattern)) OF
AperiodicTrafficInfo
AperiodicTrafficInfo ::= SEQUENCE {
    trafficDestination SL-DestinationIdentity OPTIONAL,
    reliabilityInfoSL SL-Reliability OPTIONAL,
    delaybudgetSL SL-Delaybudget OPTIONAL,
    qosInfoSL SL-PQI OPTIONAL
}
```

According to an embodiment, an operation method of a base station may include acquiring aggregated maximum bit rate (AMBR) information regarding a PC5 unicast link for sidelink communication of a terminal, allocating a resource for sidelink communication of the terminal based on the AMBR information, and transmitting information regarding the allocated resource to the terminal.

According to an embodiment, the method may further include receiving a signal for requesting sidelink radio bearer (SLRB) configuration from the terminal, and transmitting the SLRB configuration to the terminal, wherein the signal includes a flow for the sidelink communication; the PC5 unicast link mapped to the flow; and AMBR information regarding the PC5 unicast link.

According to an embodiment, the method may further include receiving a signal for requesting a resource for the sidelink communication from the terminal, wherein the signal includes: a flow for the sidelink communication; the PC5 unicast link mapped to the flow; and AMBR information regarding the PC5 unicast link.

According to an embodiment, the method may further include receiving a first signal for requesting sidelink radio bearer (SLRB) configuration from the terminal, transmitting the SLRB configuration to the terminal, and receiving a second signal for requesting a resource for the sidelink communication from the terminal, wherein the first signal includes AMBR information for each PC5 unicast link, and the second signal includes an identifier for the PC5 unicast link.

According to an embodiment, the method may further include receiving QoS information of the terminal from a core network entity, wherein the QoS information of the terminal includes: a flow for the sidelink communication; the PC5 unicast link mapped to the flow; and AMBR information regarding the PC5 unicast link.

According to an embodiment, an operation method of a terminal in a wireless communication system may include: acquiring aggregated maximum bit rate (AMBR) information regarding a PC5 unicast link for sidelink communication of the terminal, providing the AMBR information to a base station, receiving, from the base station, information regarding a resource for the sidelink communication, which has been allocated based on the AMBR information, and transmitting data following the sidelink communication to another terminal based on the resource.

According to an embodiment, an operation method of a base station may include receiving a signal for requesting sidelink radio bearer (SLRB) configuration from a terminal, acquiring packet type information regarding a sidelink flow of the terminal from the signal, generating SLRB configuration information regarding a packet type of the sidelink flow based on the packet type information, and transmitting the SLRB configuration information to the terminal, wherein the packet type is at least one of an IP packet, a non-IP packet, PC5-S signaling, and PC5-radio resource control (RRC) signaling.

According to an embodiment, an operation method of a terminal in a wireless communication system may include generating a sidelink flow for sidelink communication of the terminal, determining a packet type of the sidelink flow, and identifying sidelink radio bearer (SLRB) configuration corresponding to the packet type, wherein the identifying of the SLRB configuration includes receiving information regarding SLRB configuration corresponding to the packet type from a base station when the terminal is in radio resource control (RRC) CONNECTED, receiving configuration information including SRLB configuration for each packet and identifying SLRB configuration corresponding to the packet type from the configuration information when the terminal is in RRC INACTIVE or RRC IDLE, and identifying the SLRB configuration corresponding to the packet type from pre-configuration information including the SRLB configuration for each packet when the terminal is located out-of-coverage.

According to an embodiment, an operation method of a first terminal in a wireless communication system may include generating a sidelink flow for sidelink communication between a first terminal and a second terminal, and transmitting sidelink-related information for indicating a packet type of the sidelink flow to the second terminal, wherein the packet type is identified based on at least one of: an identifier of the sidelink flow of a service data adaptation protocol (SDAP) layer of the first terminal; sidelink radio bearer (SLRB) information mapped to the sidelink flow of the first terminal; or a service data unit (SDU) type of a packet data convergence protocol (PDCP) layer of the first terminal.

According to an embodiment, the sidelink-related information may include at least one of an identifier of the sidelink flow, the SLRB information, and an identifier of the packet type.

According to an embodiment, a base station in a wireless communication system may include at least one transceiver and at least one processor coupled to the at least one transceiver, wherein the at least one processor is configured to acquire aggregate maximum bit rate (AMBR) information regarding a PC5 unicast link for sidelink communication of the terminal, allocate a resource for sidelink communication of the terminal based on the AMBR information, and transmit information regarding the allocated resource to the terminal.

According to an embodiment, the at least one processor may be further configured to receive a signal for requesting sidelink radio bearer (SLRB) configuration from the terminal, and transmit the SLRB configuration to the terminal, wherein the signal includes a flow for the sidelink communication: the PC5 unicast link mapped to the flow; and AMBR information regarding the PC5 unicast link.

According to an embodiment, the at least one processor may be further configured to receive a signal for requesting a resource for the sidelink communication from the terminal, wherein the signal includes a flow for the sidelink communication; the PC5 unicast link mapped to the flow; and AMBR information regarding the PC5 unicast link.

According to an embodiment, the at least one processor may be further configured to receive a first signal for requesting sidelink radio bearer (SLRB) configuration from the terminal, transmit the SLRB configuration to the terminal, and receive a second signal for requesting resources for the sidelink communication from the terminal, wherein the first signal includes AMBR information for each PC5 unicast link, and the second signal includes an identifier for the PC5 unicast link.

According to an embodiment, the at least one processor may be further configured to receive QoS information of the terminal from a core network entity, and the QoS information of the terminal includes: a flow for the sidelink communication; the PC5 unicast link mapped to the flow; and AMBR information regarding the PC5 unicast link.

According to an embodiment, the terminal may include at least one transceiver, and at least one processor coupled to the at least one transceiver, wherein the at least one processor is configured to acquire aggregated maximum bit rate (AMBR) information regarding a PC5 unicast link for sidelink communication of the terminal, provide the AMBR information to a base station, receive, from the base station, information regarding a resource for the sidelink communication, which has been allocated based on the AMBR information, and transmit data following the sidelink communication to another terminal based on the resource.

According to an embodiment, a base station may include at least one transceiver, and at least one processor coupled to the at least one transceiver, wherein the at least one processor is configured to receive a signal for requesting sidelink radio bearer (SLRB) configuration from a terminal, acquire packet type information regarding a sidelink flow of the terminal from the signal, generate SLRB configuration information regarding a packet type of the sidelink flow based on the packet type information, and transmit the SLRB configuration information to the terminal, wherein the packet type is at least one of an IP packet, a non-IP packet, PC5-S signaling, and PC5-radio resource control (RRC) signaling.

According to an embodiment, a terminal may include at least one transceiver, and at least one processor coupled to the at least one transceiver, wherein the at least one processor is configured to generate a sidelink flow for sidelink communication of the terminal, determine a packet type of the sidelink flow, and identify sidelink radio bearer (SLRB) configuration corresponding to the packet type, wherein, in order to identify the SLRB configuration, the at least one processor is configured to receive information regarding SLRB configuration corresponding to the packet type from a base station when the terminal is in radio resource control (RRC) CONNECTED, receive configuration information including SRLB configuration for each packet and identify SLRB configuration corresponding to the packet type from the configuration information when the terminal is in RRC INACTIVE or RRC IDLE, and identify the SLRB configuration corresponding to the packet type from pre-configuration information including the SRLB configuration for each packet when the terminal is located out-of-coverage.

According to an embodiment, a first terminal may include at least one transceiver, and at least one processor coupled to the at least one transceiver, wherein the at least one processor is configured to generate a sidelink flow for sidelink communication between a first terminal and a second terminal, and transmit sidelink-related information for indicating a packet type of the sidelink flow to the second terminal, wherein the packet type is identified based on at least one of: an identifier of the sidelink flow of a service data adaptation protocol (SDAP) layer of the first terminal; sidelink radio bearer (SLRB) information mapped to the sidelink flow of the first terminal; or a service data unit (SDU) type of a packet data convergence protocol (PDCP) layer of the first terminal.

According to an embodiment, the sidelink-related information may include at least one of an identifier of the sidelink flow, the SLRB information, and an identifier of the packet type.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
   receiving a sidelink signal;
   obtaining sidelink control information (SCI) of the sidelink signal, wherein the SCI includes a cast type indicator indicating one of broadcast, groupcast, or unicast, and first identifier information;
   obtaining a medium access control (MAC) packet data unit (PDU) of the side link signal, wherein a header of the MAC PDU includes second identifier information;
   identifying a cast type of the sidelink signal based on the cast type indicator;
   determining whether to deliver the MAC PDU of the sidelink signal based on the identified cast type, the first identifier information, and the second identifier information; and
   delivering the MAC PDU of the sidelink signal to a next entity.

2. The method of claim 1, wherein the first identifier information includes at least one of first source identifier information or first destination identifier information, and wherein the second identifier information includes at least one of second source identifier information or second destination identifier information.

3. The method of claim 1, wherein the first identifier information includes first source identifier information and first destination identifier information, and
   wherein the second identifier information includes second source identifier information and second destination identifier information.

4. The method of claim 1, further comprising:
   obtaining a packet type identifier of a packet data convergence protocol (PDCP) layer of the sidelink signal; and
   transmitting a packet of the sidelink signal to a corresponding higher layer based on the packet type identifier,
   wherein the packet type identifier indicates an Internet protocol (IP) packet or a non-IP packet.

5. A method performed by a terminal in a wireless communication system, the method comprising:
   generating a medium access control (MAC) packet data unit (PDU) for a side link signal, wherein a header of the MAC PDU includes first identifier information;
   generating the sidelink signal including sidelink control information (SCI) for the sidelink signal, based on the MAC PDU, wherein the SCI includes a cast type indicator indicating one of broadcast, groupcast, or unicast, and the first identifier information; and
   transmitting the sidelink signal,
   wherein the cast type indicator, the first identifier information, and the second identifier information indicate whether to deliver the MAC PDU of the sidelink to a next entity.

6. The method of claim 5, wherein the first identifier information includes at least one of first source identifier information or first destination identifier information, and
   wherein the second identifier information includes at least one of second source identifier information or second destination identifier information.

7. The method of claim 5, wherein the first identifier information includes first source identifier information and first destination identifier information, and
   wherein the second identifier information includes second source identifier information and second destination identifier information.

8. The method of claim 5, further comprising configuring a packet type identifier of a packet data convergence protocol (PDCP) layer of the sidelink signal,
   wherein the packet type identifier indicates an Internet protocol (IP) packet or a non-IP packet.

9. A terminal in a wireless communication system, the terminal comprising:
   a transceiver; and
   a controller coupled with the transceiver, and configured to:
     receive a sidelink signal,
     obtain sidelink control information (SCI) of the sidelink signal, wherein the SCI includes a cast type indicator indicating one of broadcast, groupcast, or unicast, and first identifier information, and
     obtain a medium access control (MAC) packet data unit (PDU) of the side link signal, wherein a header of the MAC PDU includes second identifier information,
     identify a cast type of the sidelink signal based on the cast type indicator, determine whether to deliver the MAC PDU of the sidelink signal based on the identified cast type, the first identifier information, and the second identifier information, and deliver the MAC PDU of the sidelink signal to a next entity.

10. A terminal in a wireless communication system, the terminal comprising:

a transceiver; and a controller coupled with the transceiver, and configured to:

generate a medium access control (MAC) packet data unit (PDU) for a side link signal, wherein a header of the MAC PDU includes first identifier information, generate the sidelink signal including sidelink control information (SCI) for the sidelink signal, based on the MAC PDU, wherein the SCI includes a cast type indicator indicating one of broadcast, groupcast, or unicast, and first identifier information, and transmit the sidelink signal, wherein the cast type indicator, the first identifier information, and the second identifier information indicate whether to deliver the MAC PDU of the sidelink to a next entity.

11. The terminal of claim 9, wherein the first identifier information includes at least one of first source identifier information or first destination identifier information, and wherein the second identifier information includes at least one of second source identifier information or second destination identifier information.

12. The terminal of claim 9, wherein the first identifier information includes first source identifier information and first destination identifier information, and wherein the second identifier information includes second source identifier information and second destination identifier information.

13. The terminal of claim 9, wherein the controller is further configured to:

obtain a packet type identifier of a packet data convergence protocol (PDCP) layer of the sidelink signal, and transmit a packet of the sidelink signal to a corresponding higher layer based on the packet type identifier, and wherein the packet type identifier indicates an Internet protocol (IP) packet or a non-IP packet.

14. The terminal of claim 10, wherein the first identifier information includes at least one of first source identifier information or first destination identifier information, and wherein the second identifier information includes at least one of second source identifier information or second destination identifier information.

15. The terminal of claim 10, wherein the first identifier information includes first source identifier information and first destination identifier information, and wherein the second identifier information includes second source identifier information and second destination identifier information.

16. The terminal of claim 10, wherein the controller is further configured to configure a packet type identifier of a packet data convergence protocol (PDCP) layer of the sidelink signal, and wherein the packet type identifier indicates an Internet protocol (IP) packet or a non-IP packet.

* * * * *